(12) United States Patent
Radic

(10) Patent No.: US 7,796,244 B2
(45) Date of Patent: Sep. 14, 2010

(54) METHOD FOR MAPPING OF DISPERSION AND OTHER OPTICAL PROPERTIES OF OPTICAL WAVEGUIDES

(75) Inventor: Stojan Radic, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 181 days.

(21) Appl. No.: 12/233,237

(22) Filed: Sep. 18, 2008

(65) Prior Publication Data

US 2009/0079967 A1 Mar. 26, 2009

Related U.S. Application Data

(60) Provisional application No. 60/973,765, filed on Sep. 20, 2007.

(51) Int. Cl.
  *G01N 21/00* (2006.01)
  *G01B 9/02* (2006.01)
(52) U.S. Cl. ...................... 356/73.1; 356/483
(58) Field of Classification Search ................ 356/73.1, 356/477, 483
See application file for complete search history.

(56) References Cited

U.S. PATENT DOCUMENTS

| | | | |
|---|---|---|---|
| 6,067,149 A | 5/2000 | Gripp et al. | |
| 6,781,749 B2 | 8/2004 | Radic | |
| 6,819,481 B2 | 11/2004 | Delavaux et al. | |
| 6,850,677 B2 | 2/2005 | Dennis et al. | |
| 7,145,715 B2 | 12/2006 | Chraplyvy et al. | |
| 7,324,759 B2 | 1/2008 | McKinstrie et al. | |
| 7,424,191 B2 * | 9/2008 | Tadakuma et al. | 356/73.1 |

FOREIGN PATENT DOCUMENTS

JP 2003-130761 A 5/2003
KR 10-2004-0091809 A 11/2004

OTHER PUBLICATIONS

Kwang-Yong Song et al., Mapping of Chromatic-Dispersion Distribution Along Optical Fibers With 20-m Spatial Resolution, Journal of Lightwave Technology, 12, Dec. 2005, vol. 23, No. 12, see pp. 2-5, Fig. 1-2.
Miguel Gonzalez-Herraez and Luc Thevenaz, Simultaneous Position-Resolve Mapping of Chromatic Dispersion and Brillouin Shift Along Single-Mode Optical Fibers, IEEE Photonics Technology Letters, Apr. 4, 2004, vol. 16, No. 4.
International Search Report and Written Opinion issued Mar. 16, 2009 for PCT/US2008/076852.

* cited by examiner

*Primary Examiner*—Patrick J Connolly
(74) *Attorney, Agent, or Firm*—Eleanor M. Musick; Procopio, Cory, Hargreaves & Savitch, LLP

(57) ABSTRACT

A method is provided for measurement of dispersion or other optical and mechanical properties within a waveguide by inducing four-photon mixing at different locations within the waveguide by timing a pump signal to counter-collide with and abruptly amplify or attenuate one or both of a probe pulse and a signal pulse at each location. The measurement of the components of the resulting mixing signal created by each collision is used to calculate dispersion defined by the location at which the collision occurred. By combining the measurements from all of the locations, a spatial map of dispersion or other optical or mechanical properties within the waveguide can be generated.

57 Claims, 19 Drawing Sheets

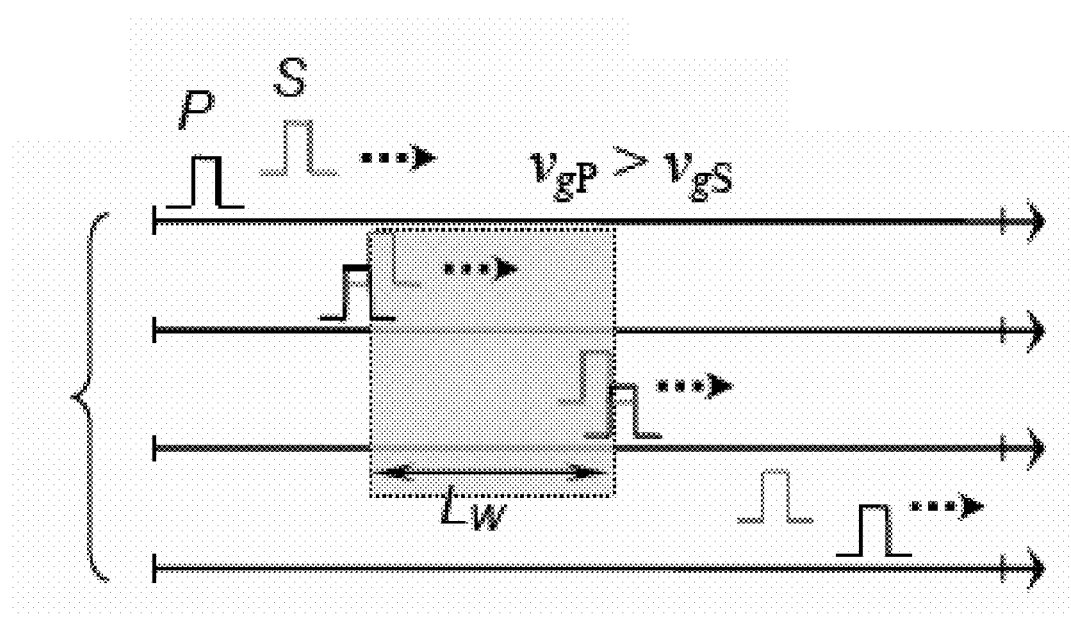
FIG. 1a          PRIOR ART
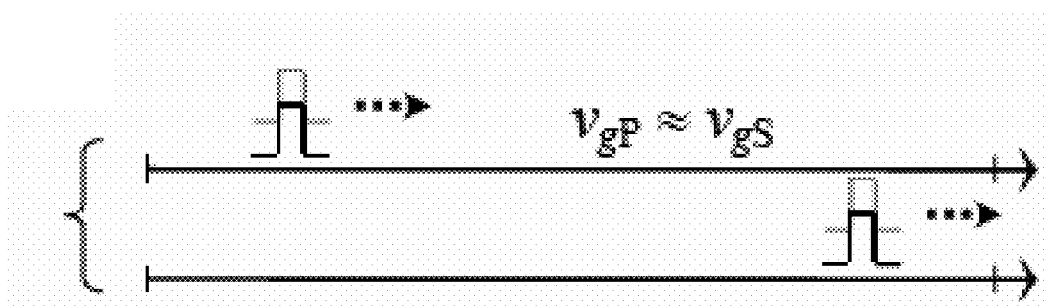
FIG. 1b          PRIOR ART

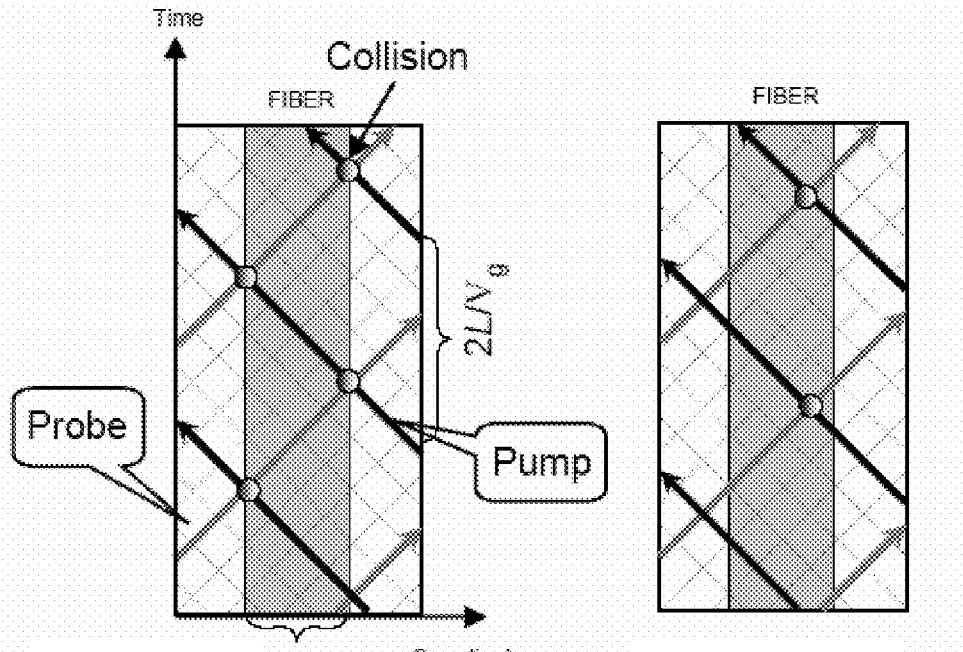
FIG. 16a  FIG. 16b
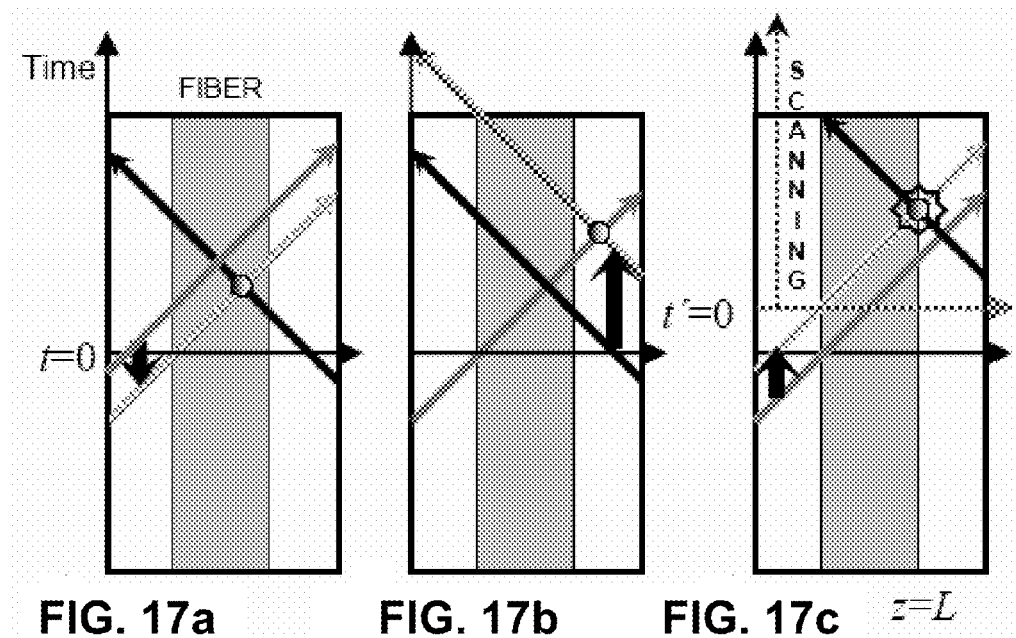
FIG. 17a  FIG. 17b  FIG. 17c

METHOD FOR MAPPING OF DISPERSION AND OTHER OPTICAL PROPERTIES OF OPTICAL WAVEGUIDES

RELATED APPLICATIONS

This application claims the priority of U.S. Provisional Application No. 60/973,765, filed Sep. 20, 2007, which is incorporated herein by reference in its entirety.

BACKGROUND OF THE INVENTION

The introduction of highly nonlinear fibers (HNLF) has revolutionized optical parametric processing, allowing for the first time the construction of true continuous-wave (CW), high efficiency devices. In contrast to centimeter-long crystalline devices, phase-matched interaction in HNLF can take place over hundreds of meters and have efficiencies exceeding 40 dB. Similar to conventional fiber, microscopic variation in HNLF transverse geometry can lead to spatially-localized dispersion fluctuations. As a result, the phase matching condition varies along the length of the fiber. This variation has been identified as the fundamental obstacle to the construction of wideband parametric devices.

Recent fabrication advances have reduced transverse HNLF variations to multiples of the $SiO_2$ molecular diameter. The ratio between transverse HNLF dimension fluctuation and its longitudinal scale reaches the value of $10^{-12}$, making the HNLF one of the most precisely fabricated structures in modern engineering. Indeed, to match this ratio, a typical 100 micron-long monolithic waveguide would have transverse tolerance smaller than the diameter of a single atomic nucleus. The remarkable control of the HNLF cross-sectional variances makes further tightening of the fabrication process a difficult proposition, suggesting a need for alternative means for phase matching control over long length of fiber.

Rather than insisting on unattainable fabrication tolerances (at least according to current state of the art methods), wideband parametric synthesis can be achieved by obtaining nearly exact map of HNLF dispersion fluctuation, which can subsequently be used to either select specific waveguide sections or concatenate fiber segments. Unfortunately, the magnitude of these fluctuations is well below the sensitivity and spatial resolution of existing dispersion measurement techniques. As a result, present research relies on the assumption that the phase matching condition changes randomly along the length of the fiber. In fact, two HNLF sections obtained from a single fiber draw can behave quite differently depending on their local dispersion properties, in spite of their identical global characteristics. Conventional techniques are characterized by sub-km spatial resolution and are designed to analyze fiber types such as conventional single mode fiber (SMF) or non-zero dispersion shifted fiber (NZDSF) that possess high chromatic dispersion. In contrast, wideband parametric synthesis requires meter-scale spatial resolution in nearly dispersionless fibers such as HNLF. In fact, typical HNLF characteristics include nearly 100 times lower dispersion that that of conventional SMF at 1550 nm.

FIGS. 1a and 1b illustrate the basic principle of a commonly used method for dispersion measurement. Co-propagating waves (signal (S) and probe (P)) are launched to generate FPM tones along a specified fiber section. In the case of a highly dispersive fiber, as shown in FIG. 1a, incident pulses can be precisely synchronized in order to generate FPM products along any fiber subsection. Co-propagating pulses separated by $\Delta\lambda$ will generate FPM light only within the fiber section in which they are spatially overlapped. The length of this section is defined by the walk-off length:

$$L_W = \frac{\tau}{\Delta(1/v_g)} = \frac{\tau}{D\Delta\lambda}, \quad (1)$$

where D is the fiber dispersion, $\tau$ is the pulse duration, and $v_g$ is the mean group velocity. As a result, the effective spatial resolution is inversely proportional to the fiber dispersion, allowing for high-resolution measurements in conventional SMF and, to a lesser degree, in NZDSF. In practice, spatial resolution of approximately 100 m is routinely demonstrated in the conventional fiber types.

In the case of nearly dispersionless fibers, such as HNLF, the walk-off length necessarily diverges ($L_W \sim L$) and the technique fails to provide spatially resolved measurements. This deficiency is easily visualized with reference to FIG. 1b, by noting that, for nearly equal group velocities, two co-propagating pulses will never separate in the case when launched synchronously. Conversely, if their launch is delayed, the pulses will never collide within the practical length of the fiber under test. While FPM generation will be maximized in the first case, it can only be used to obtain a global, rather than a spatially-localized dispersion measurement. Assuming that two 100 ps-long interacting pulses are separated by 40 nm and launched into HNLF with dispersion slope $S_\lambda=0.025$ ps/nm²/km, the corresponding walk-off distance is 5 km. Such a length scale is considerably longer than a typical parametric device length (~100 m), thus imposing a key limitation to the practical value of this technique.

Accordingly, there remains a need for a new method for measuring dispersion with sufficient sensitivity and spatial resolution to measure the dispersion of HNLF and similar fibers with the ultimate goal of reproducible manufacturing of high quality fiber, making it a viable bulk product line. The present invention directed to such a method.

SUMMARY OF THE INVENTION

A new technique for measurement and mapping of dispersion and optical properties of fiber and optical waveguides is provided. The technique uses highly localized (in space) power transfer between counter-propagating pulses in order to create deterministic, localized characterization of the optical sample. In one embodiment, the technique can be used for a precise dispersion mapping of fiber possessing arbitrary chromatic dispersion, enabling the design of a broad class of optical devices or optical subsystems that rely on precise phase matching or dispersion map control.

The inventive method is a new dispersion measurement technique based on selective localization of four-photon mixing (FPM). The FPM localization is achieved by counter-colliding power delivery to a weak probe pulse and is used for high resolution dispersion retrieval along the fiber length.

In contrast to conventional dispersion mapping techniques, the new method uses counter-propagating optical interaction to deliver optical energy in highly localized fashion. The pulse duration of counter-colliding pulses precisely determines the spatial resolution of the measurement. The technique performance (accuracy, resolution) is considerably higher than that of conventional techniques, and particularly superior in low-dispersion samples, such as HNLF or dispersion shifted fiber.

According to the inventive method, localized interaction between two or more copropagating optical signals is used to measure, with high spatial resolution, the dispersion (or other optical or mechanical properties) of the waveguide (fiber).

The fundamental deficiency of the prior art methods is addressed by introducing the localized energy transfer targeting one or both co-propagating signals. In the simplest scheme, assume that two signals are weak and produce only weak FPM tones. If one inserts a counter-propagating (pump) signal that travels in the opposite (counter-propagating) direction, the interaction length between the co-propagating signal(s) and the counter-propagating pump will be strictly defined by the user and is independent on fiber properties. The interaction between pump and signal(s) will take place only during the spatial overlap between the counterpropagating pulses, and is precisely controlled by the pump and signal(s) pulse duration and induced mutual delays. During the interaction period (or the pump/signal(s) spatial overlap) the pump will exchange the energy with the signal(s) and can either deliver or reduce the energy of the signal(s) pulse. The energy-exchange mechanism will be defined by the desired effect, fiber properties and available power. Examples of energy-exchange mechanism include, but are not limited to, Raman, Brilloiun and FPM process. In its simplest embodiment, it can be assumed that the pump was used to boost the energy of the signal or probe pulse, thus facilitating strong FPM interaction between two co-propagating pulses from that point on. Consequently, the power in mixing tones received at the output of the fiber corresponds to local FPM interaction, rather than FPM interaction in the entire fiber. By measuring the mixing tones, one can directly relate the dispersion (or other optical or mechanical properties) of the specific fiber section.

Using this procedure, a true, localized dispersion mapping can be performed. Signal pulse(s) and pump pulse collision is timed (synchronized) from the output end of the fiber towards its input: 1) the first measurement is taken near the fiber end; 2) the dispersion of the first measured section is determined; 3) the collision between the signal(s) and the pump is now retimed to occur at the second position deeper within the fiber; 4) dispersion of the composite section (first and second sections) is measured and used to calculate local dispersion of the second fiber segment; the procedure is iterated until the front of the fiber is reached. The completion of the above procedure produces a precise dispersion map of the fiber (waveguide) under test.

BRIEF DESCRIPTION OF THE DRAWINGS

FIGS. 1a and 1b are diagrams showing the interaction of co-propagating pulses in the case of high waveguide dispersion (FIG. 1a) and no waveguide dispersion (FIG. 1b) using a prior art technique.

FIG. 2b shows counter-propagating signals, FIG. 2c shows the collision and its results; and FIG. 2d shows the FPM sidebands generated as a result.

FIGS. 16a and 16b are diagrams of a time-space collision analysis at the beginning of and within the fiber, respectively.

FIGS. 17a-17c are diagrams of a three-step calibration procedure using a manual search.

DETAILED DESCRIPTION OF THE PREFERRED EMBODIMENTS

The present invention is based on the principle that co-propagating waves with sufficiently low power will not generate significant mixing terms, even when propagating in a low-dispersion waveguide. By engineering spatially-discrete (abrupt) means for power adjustment (increase or decrease) anywhere along the fiber, the FPM generation can then be switched on or off in a spatially-selective manner.

Figure 2A:
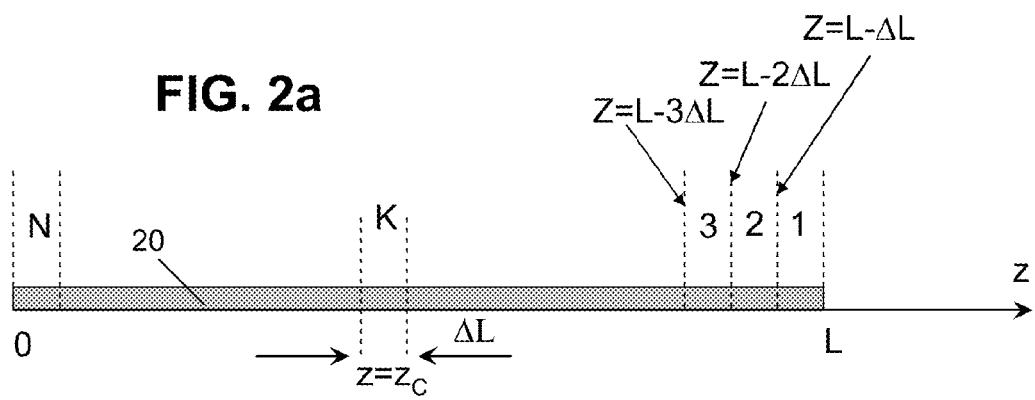
FIG. 2a is a diagrammatic illustration of the dispersion mapping algorithm of the present invention.

Utilizing the FPM measurement method of one embodiment, a localized dispersion mapping can be performed, as illustrated in FIG. 2a. Signal and probe pulse (S and P) and pump pulse (II) collision is timed (synchronized) from the output end of the waveguide towards its input: 1) the first measurement is taken close to the fiber end (between $z=L$ and $z=L-\Delta L$, where $\Delta L$ corresponds to the spatial resolution of the technique defined by pump/signal pulse duration); 2) the dispersion of the first measured section (from $z=L-\Delta L$ to $z=L$) is determined; 3) the collision between the signal(s) and the pump is then retimed to occur at the next position deeper within the fiber (z=L−2ΔL); 4) dispersion of the composite section (z=L−2ΔL to z=L) is measured and used to calculate local dispersion of the new fiber segment (z=L−2ΔL to z=L−ΔL); the procedure is iterated until the front of the fiber (z=0) is reached. The results of the measurement and calculation at each location are combined to produce a precise dispersion map of the fiber (waveguide) under test, with corresponding resolution of ΔL.

Figure 2B:
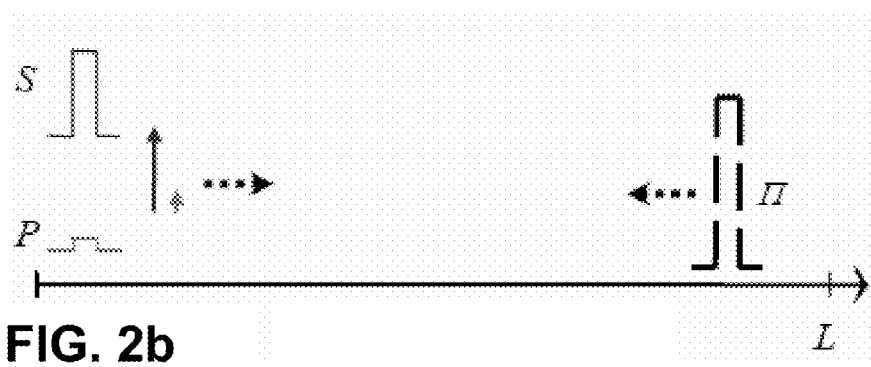
FIGS. 2b-2d are diagrammatic illustrations of the four-photon mixing principle in a waveguide, where
Figure 2C:
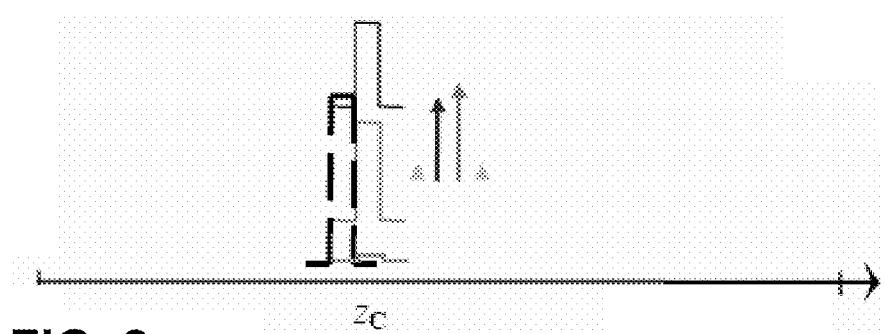
Figure 2D:
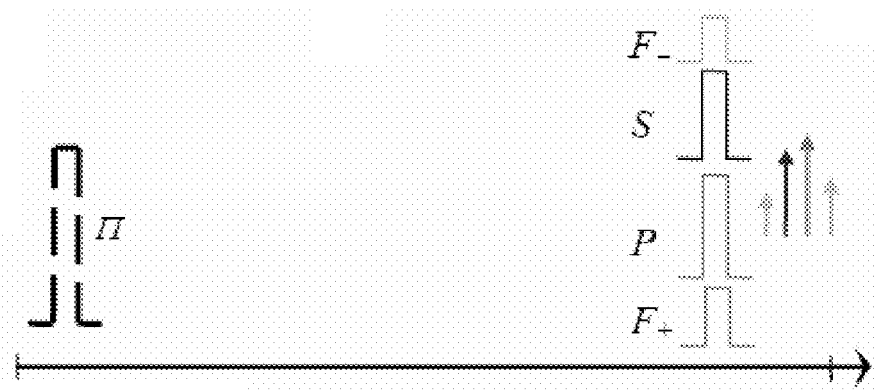

The steps of the FPM localization measurement technique in an arbitrarily dispersive waveguide are illustrated in FIGS. 2b-2d. In this embodiment and the following description, two signal pulses launched into the waveguide are defined as a probe pulse P and a signal pulse S, respectively. The frequency non-degenerate signal (S) and probe (P) pulses are weak pulses launched into the waveguide with sufficiently low powers so that signal-probe mixing is negligible (FIG. 2b). In other words, the single and probe pulses are weak pulses insufficient to produce useful levels of four-photon mixing (FPM). The power of a single (or both) pulses is abruptly increased at the selected collision point ($z_c$), resulting in efficient signal-probe mixing along the remaining waveguide section. Highly localized power delivery is accomplished by a counter-propagating pump pulse (Π) that interacts with one (or both) pulse(s) during the brief flythrough interval (FIG. 2c). The counter-colliding interaction length, defined by the pump-probe pulse convolution, effectively represents the physical resolution of the method. By controlling the duration of either the pump or the probe pulse, it is possible, within the limits of the physical power transfer mechanism, to arbitrarily program the spatial precision of the measurement. The powers of the signal-probe mixing terms ($F_{+/−}$) are measured for each collision instance and provide a unique signature of spatially distinct FPM processes (FIG. 2d). By moving the collision location $z_c$ arbitrarily along the fiber, e.g., the different ΔLs shown in FIG. 2a, the FPM signatures of progressively longer (or shorter) fiber sections are obtained until the entire fiber length is scanned. The FPM powers corresponding to all of the collision points can then be combined to generate a spatial dispersion map of the entire fiber.

Figure 2E:
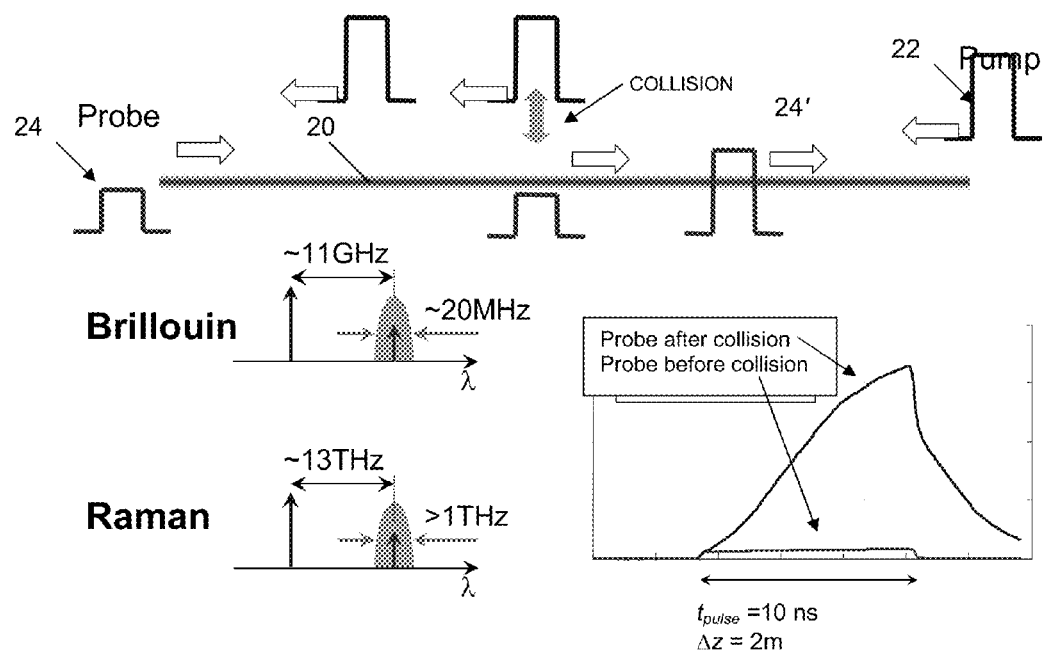
FIG. 2e provides an alternative illustration of the counter-collision scheme.

FIG. 2e provides an alternative visualization of the energy delivery scheme. A counter-propagating pump pulse 22 is launched through the output end of the waveguide 20 and timed to collide with the probe pulse 24 at a precisely-chosen fiber location. The low power of weak probe pulse 24 is abruptly amplified (24') by the counter-collision during the probe-pump flythrough.

At least two physical mechanisms may be used to amplify the probe pulse during the counter-collision instance: stimulated Raman scattering (SRS) and stimulated Brillouin scattering (SBS) effects. In the example illustrated in FIG. 2e, the pump frequency is locked at 11 GHz or 13 THz away from the probe for SBS and SRS, respectively. The bandwidth of the amplification process determines the width of the probe pulse (~ns to ~ps). The inset in FIG. 2e shows measured counter-colliding amplification of 15 dB by a Brillouin-locked pump. The relevant process parameters are compared in Table 1.

TABLE 1

| Physical Process | Raman | Brillouin |
|---|---|---|
| Gain Coefficient | −0.005 m⁻¹/W | >1 m⁻¹/W |
| Pump Power required for 10 ns pulse and 20 dB gain | >100 W | >1 W |

TABLE 1-continued

| Physical Process | Raman | Brillouin |
|---|---|---|
| 3 dB-bandwidth | 10 THz | 20 MHz |
| Time Response Δt* | 0.05 ps | 25 ns |
| Corresponding Spatial Resolution, vΔt | 10 μm | 5 m |

(*The characteristic response time Δt is calculated assuming the relation for the time-bandwidth product for Gaussian gain profile $\Delta\tau_{1/2}\Delta\nu_{1/2} \approx \frac{1}{2}$.)

Although the Raman process is considerably faster and supports picosecond pulse amplification, the stimulated Brillouin interaction in one embodiment has nearly a hundred-fold larger gain coefficient and, therefore, requires lower pump powers. Further, the interaction distance (~m) required for a HNLF-like measurement target is short enough to reduce or eliminate any significant noise accumulation in the case when Brillouin power delivery is used. A simple estimate of the necessary pump power can be made by requiring that the counter-colliding Brillouin pump delivers 20 dB of gain within a 2 m pump-probe flythrough interval. Assuming a standard silica gain coefficient of $4.6\times10^{-11}$/W and HNLF effective area of 10 μm², the pump pulse should have a Watt-peak power. While the counter-colliding delivery could also be achieved by Raman pumping, hundreds of Watts of peak pump power would be required in this case, and, in effect, would lead to pulse self-destruction of the pump pulse in HNLF lengths exceeding tens of meters. Consequently, in one embodiment, the Brillouin pumping scheme is used for long (~km) measurements, while Raman pumping is used for short waveguide mapping (~m) that requires sub-millimeter spatial resolution.

Figure 3:
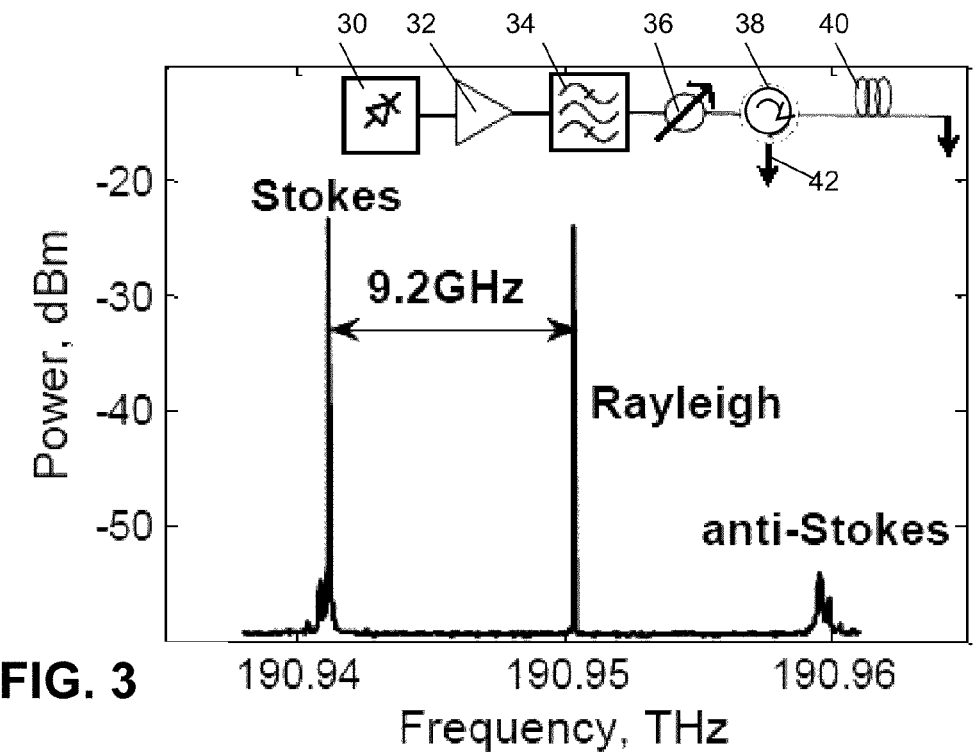
FIG. 3 is a plot of frequency versus power showing the backreflected spectrum generated in a 270 m HNLF sample.
Figure 4:
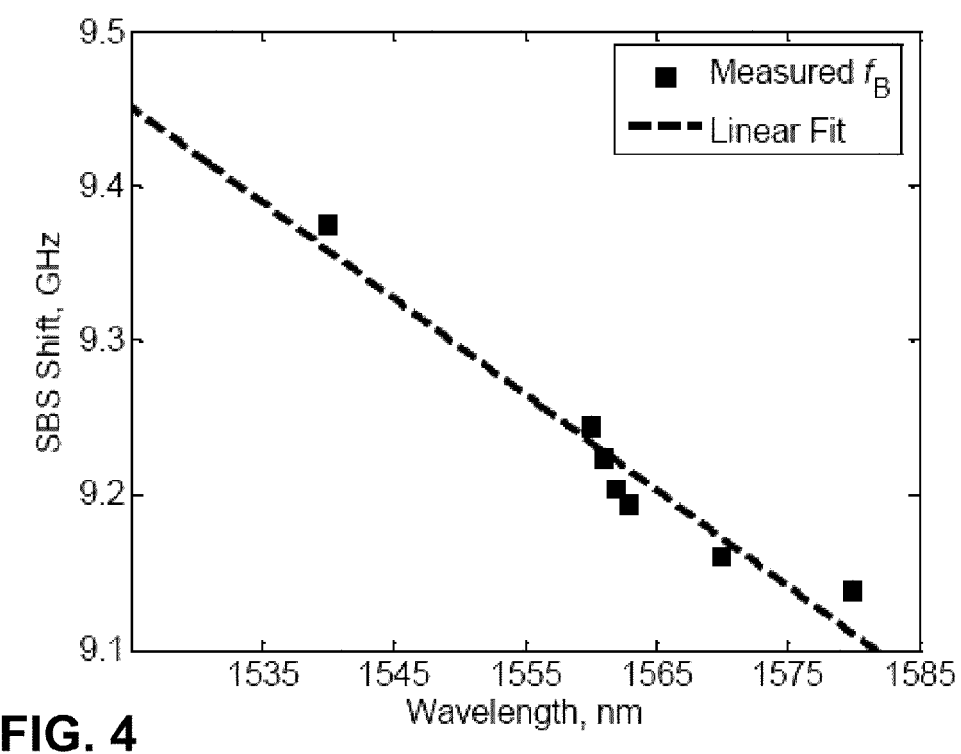
FIG. 4 is a plot of measured SBS shift in a 200 m long HNLF sample.

In one embodiment, the Brillouin gain spectrum of a specific HNLF sample is measured by capturing the back-reflection of strong input CW wave, using a simple setup illustrated by the inset in FIG. 3, consisting of laser source 30, amplifier 32, tunable filter 34, attenuator 36, circulator 38 and polarization controller 40. The spectrum acquisition was performed at the free circulator port 42. The back-reflected spectrum shown in FIG. 3 contains the Rayleigh peak centered at the signal frequency and symmetrically located Stokes and weak anti-Stokes waves down-shifted and up-shifted from the carrier by the characteristic phonon frequency given by the fiber composition in a HNLF sample. The SBS shift is inversely proportional to the optical wavelength of the probe, as shown by the HNLF measurement illustrated in FIG. 4, taken from a 200 m long HNLF sample. The coarse (>MHz) measurement of the Brillouin frequency was given by the spacing between the Rayleigh and the Stokes waves.

Figure 5:
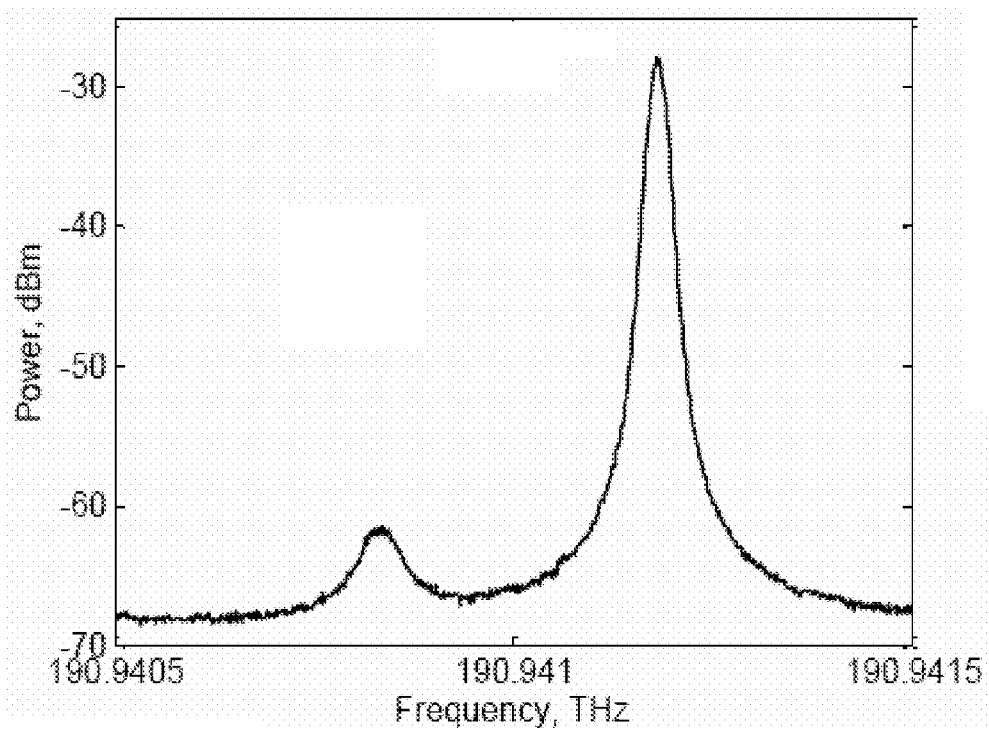
FIG. 5 is a plot of frequency versus power showing the high-resolution spectrum of the Brillouin HNLF Stokes component.
Figure 6:
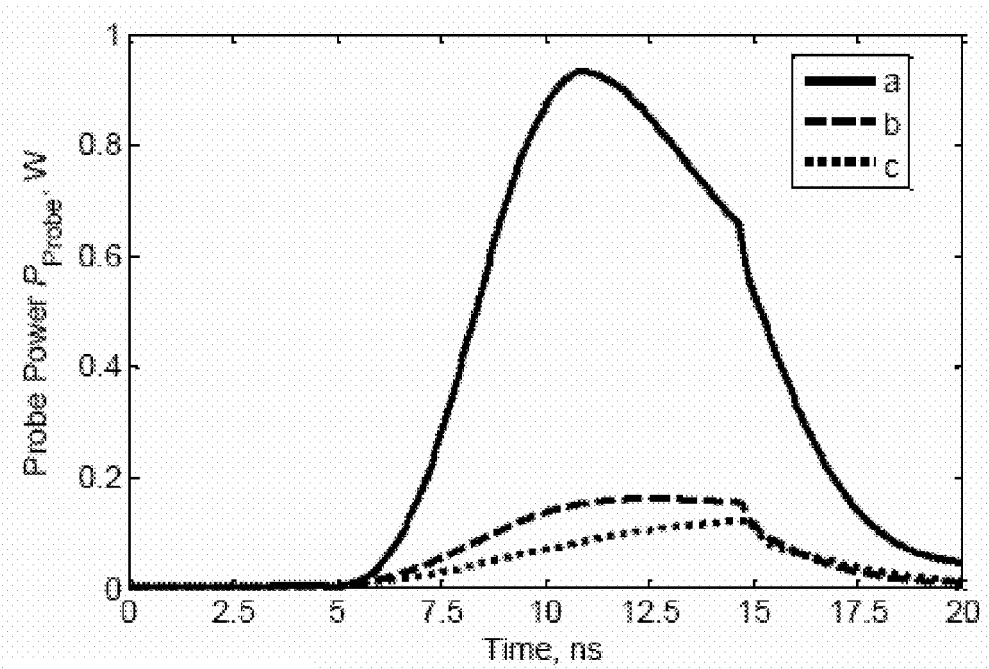
FIG. 6 is a plot showing measured waveforms of an amplified 10 ns pulse for different HNLF samples and varying SBS gain.

A high precision measurement (<MHz) was performed by maximizing the peak power of the amplified probe pulse acquired by a fast sampling oscilloscope. The Brillouin frequency-locking mechanism is further described below. The high-resolution capture of the Stokes spectrum shown in FIG. 5 indicates the primary Brillouin peak 3-dB bandwidth of 20 MHz. The secondary 65 MH-wide peak appears nearly 30 dB below the primary peak. The narrow amplification bandwidth ($\Delta\nu_B$~20 MHz) sets a limit on the duration of the probe pulse $t_B=1/(2\Delta\nu_B)$~25 ns and, consequently, on the spatial resolution of the technique (~2 m). As a result of the close match between the pulse and gain spectral width, the amplified pulse does not necessarily retain its original shape, as illustrated in FIG. 6. In other words, the instantaneous gain seen by the probe pulse varies, and the exact amplified waveform represents the convolution between the input pulse and the Brillouin gain functions.

The slow phonon-phonon interaction response, as well as the counter-propagating nature of SBS, makes the pulse amplification relatively insensitive to the exact form of the pump pulse. The latter observation is supported by the experimental measurements illustrated in FIG. 6, which is a plot of measured waveforms of the amplified 10 ns pulse for different HNLF samples and varying SBS gain. The parameters used to generate the three curves in FIG. 6 are provided in Table 2:

TABLE 2

| Curve | HNLF Section Length | Peak Input Power | Brillouin Gain |
|---|---|---|---|
| a | 270 m | 8 mW | >20 dB |
| b | 210 m | 4 mW | 16 dB |
| c | 200 m | 5 mW | 14 dB |

Gain compression leads to the variable characteristic time that can be faster than that of the calculated waveform using a bandwidth-constrained linear assumption.

The probe (pump) pulse duration represents the basic temporal resolution of the measurement. However, an intuitive argument can be constructed in which the exact temporal shape of the amplified pulse is not the sole governing factor of the measurement. While the ultrafast nature of the signal-probe mixing does respond to the instantaneous power of the pulse, the optical power measured at the end of the fiber is defined by the integration of the FPM terms during the entire pulse duration. It is also important to avoid oversimplification, since the amplified pulse shape governs higher-order accuracy of the non-linear pulse-probe interaction and is position-dependent. In addition, the experimental limitations described below can significantly affect the accuracy of the method. As a result, the technique in one embodiment combines the fact that FPM measurements are pulse-integrated measurements and incorporates the corrections borne by intra-pulse intensity variations. This point is examined in greater detail below.

Figure 7:
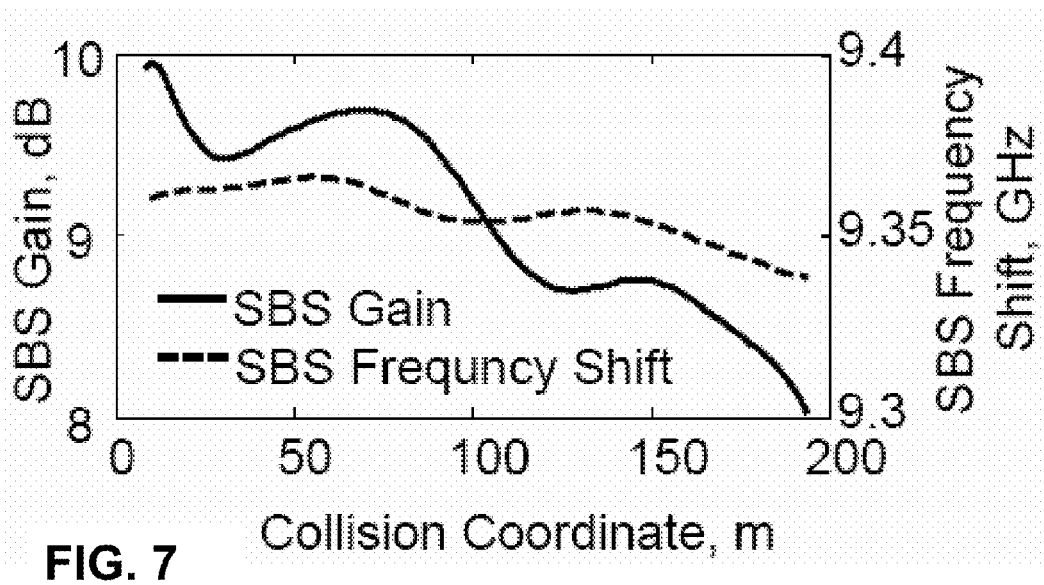
FIG. 7 is a plot of SBS frequency shift and SBS gain with the spatial coordinates referenced to the fiber end.

In one embodiment, precise or substantially precise locking between the pump and the probe center frequencies is used, due to the narrow gain profile and the variation in the Brillouin response. In one embodiment, negligible HNLF transverse geometry fluctuation is used to produce a constant or substantially constant Brillouin downshift at any fiber location. In practice, the desired Brillouin shift varies along HNLF. In one embodiment, the Brillouin downshift is matched as precisely as possible along the entire length of the fiber in order to maintain maximum or close to maximum power transfer for each collision instance. The last fact implies that the spacing between signals must be controllable with the accuracy defined by a fraction of the SBS gain bandwidth. FIG. 7 illustrates the fluctuation in SBS frequency shift along a 200 m-long HNLF section, where the spatial coordinates are referenced to the fiber end.

Another consideration relating to the counter-colliding power delivery is that stimulated Raman and Brillouin processes are polarization dependent. In practice, it can be assumed that only one polarization state is preferentially amplified and in one embodiment, polarization is controlled to produce polarization alignment at each collision instance. More importantly, experimental observations have demonstrated that control of the polarizations of both the probe and pump can maximize or substantially maximize the probe gain. This implies that their Stokes vectors are not only co-polarized, but also have a specific polarization state. Notwithstanding the foregoing, an alternative embodiment, described below with reference to FIG. 22, may be used to provide a polarization insensitive technique.

Figure 8:
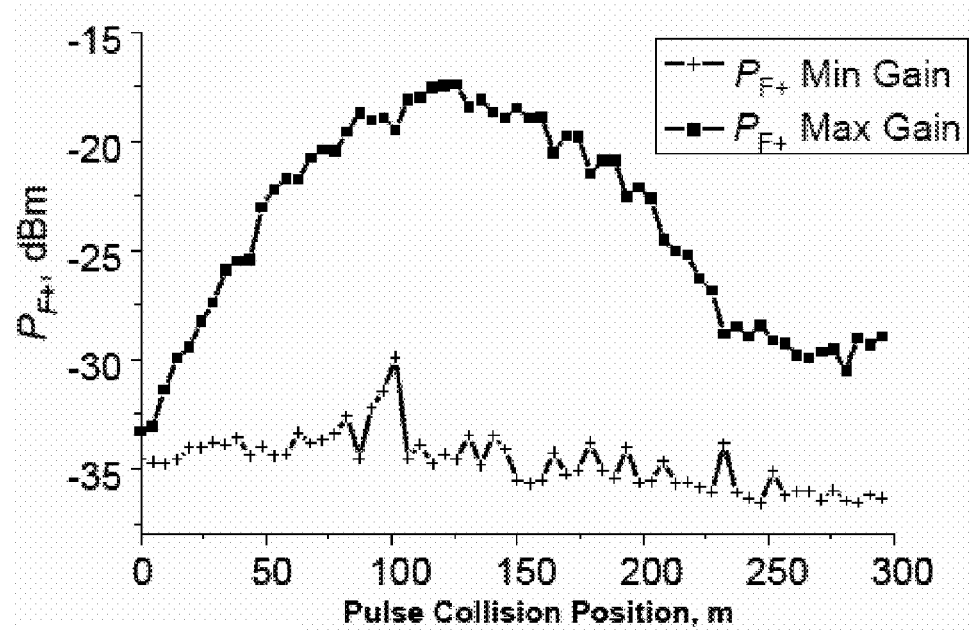
FIG. 8 is a plot of collision position versus power for the Stokes wave corresponding to the maximum and minimum Brillouin gain instance.

FIG. 8 illustrates the effect of precise collision polarization control: the average power of the Stokes FPM products was measured for polarization states corresponding to the maximum and minimum probe gain.

A spatially resolved dispersion mapping of HNLF-like fiber introduces a set of challenges with respect to sensitivity, resolution and the dynamic range of the measurement technique. The counter-colliding scanning technique depends on the accuracy and the interpretation of the FPM powers measured at the fiber end.

In one embodiment of the method, two adjacent pump-probe collision locations separated by the fiber section with finite dispersion correspond to two resolvable FPM measurements. Firstly, the accuracy of the FPM power measurement ultimately defines the resolvable phase (dispersion) increment between two spatially distinct collision points within the fiber. Secondly, the low fiber dispersion implies finite deviations of the measured powers induced by the small variations of the dispersion profile, both local and average. Thirdly, the FPM profiles (set of power measurements corresponding to the entire fiber scan) should be repeatable: independent collision sweeps should yield nearly identical results. These factors place stringent tolerance on the stability, frequency, and polarization state of the pump, probe and signal pulses as well as on the ability to maintain strictly calibrated power acquisition throughout the measurement. Additionally, FPM powers should be sufficiently high to provide acceptable optical signal to noise ratio (OSNR), even in the case when the pump-probe collision is located close to the fiber end and exceedingly low mixing powers are generated. Finally, the FPM measurements should provide sufficient spatial information to retrieve the dispersion fluctuation map.

After the counter-collision-mitigated amplification, the energetic pulses generate FPM products with an oscillation period that is inversely proportional to the phase mismatch. The maximum gain/depletion for FPM sideband, as well as the high sensitivity, occurs when this phase mismatch is close to integer values of $\pi$. Unfortunately, the interval of fast growth is followed by an interval where the pulse power is near-constant, having low sensitivity to local dispersion deviations. The last observation implies that the periods of FPM oscillation are adequately resolved, thereby providing the "contrast" of the measurement with respect to the dispersion fluctuation. The last requirement is typically in contradiction with the requisite for high FPM powers or, equivalently, measured OSNR. All the stated requirements are naturally combined with the primary motivation for sample-specific spatial resolution. Indeed, while a 100 m spatial resolution might be appropriate for SMF and NZDSF samples, that sub-10 m resolution is appropriate for HNLF sample characterization. In one embodiment, this resolution scale falls well within empirical parameters observed following testing of more than 50 different HNLF samples.

Figure 9A:
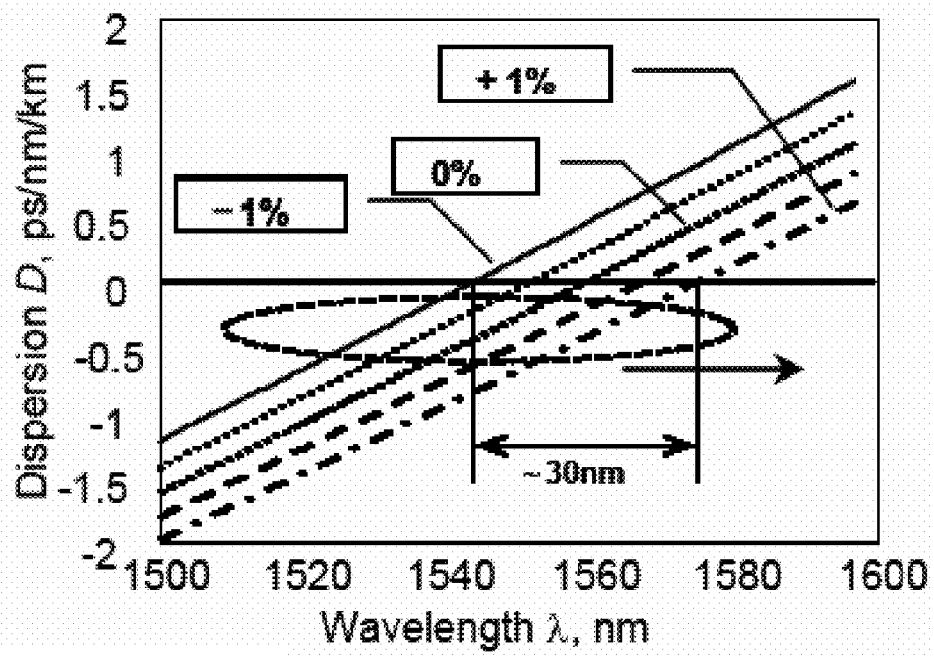
FIGS. 9a and 9b are plots of HNLF chromatic dispersion and slope sensitivity, respectively, to transversal profile perturbation.
Figure 9B:
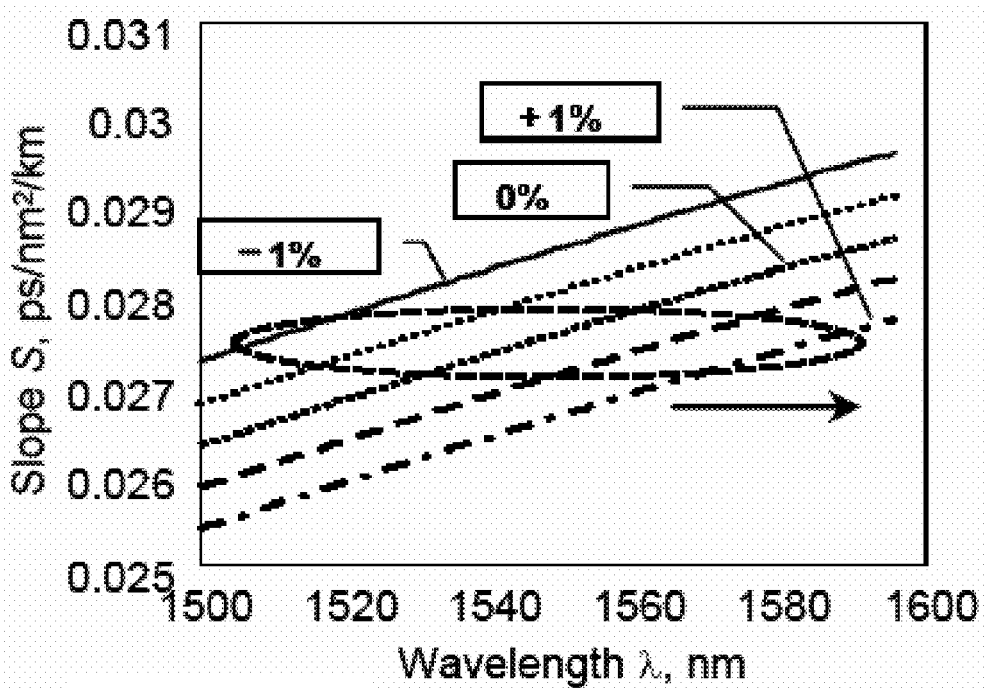

While the physical mechanisms leading to spatially fluctuating HNLF are intuitively clear (preform geometry, draw temperature, tension, mechanical stability during the draw process), the precise description of the resulting stochastic waveguide is more elusive. The full position-wavelength analysis of the dispersion characteristics of the fiber under test is complicated, both from experimental and theoretical points of view, but the complexity of this problem may be reduced by decreasing the number of unknown parameters. Typically, knowledge of the dispersion and the slope of the waveguide as a function of coordinate should be sufficient to predict the behavior of an HNL-based waveguide. A rigorous description of HNLF fluctuation can be achieved by deriving its dispersion directly from the transverse index profile and perturbing its radius. In the first step of this process, the equation for cylindrically symmetric waveguide:

$$\hat{L}E = \frac{\partial}{\partial r}\left(\frac{1}{\varepsilon(r)}\frac{\partial}{\partial r}(\varepsilon(r)E)\right) + \frac{1}{r}\frac{\partial}{\partial r}E - \frac{l^2}{r^2} + \varepsilon(r)k_0^2 E \quad (2)$$
$$= n_{\text{eff}}^2 k_0^2 E$$
$$= \lambda E$$

is projected to a sufficiently dense discrete spatial grid using the known profile $\varepsilon(r)$ and converted to the matrix form $L_{ij}E_j=\lambda E_j$. This formulation allows Equation (2) to be transformed to the standard eigenvalue problem governed by the (variable) effective index $n_{\text{eff}}$ and the mode profile $E_j$. In the second step, the fractional (~1%) core diameter perturbation is introduced and the new waveguide dispersion is computed. This methodology is used to compute the impact of varying radial geometry on a typical HNLF waveguide, as illustrated in FIG. 9. The reference (unperturbed) waveguide was designed for $\lambda_0=1560$ nm. The core radius was perturbed by ±0.5% and 1%. It should be noted that only 1% perturbation in the core diameter results in a greater than 10 nm deviation of the zero dispersion wavelength (ZDW). However, it is somewhat surprising that the same transverse perturbation leads to only 6% deviation in dispersion slope. The fact that the dispersion slope is only a weakly varying parameter along the longitudinal direction can be exploited during the construction of the dispersion retrieval procedure since it significantly reduces the number of the degrees of freedom of the inverse problem.

Figure 10:
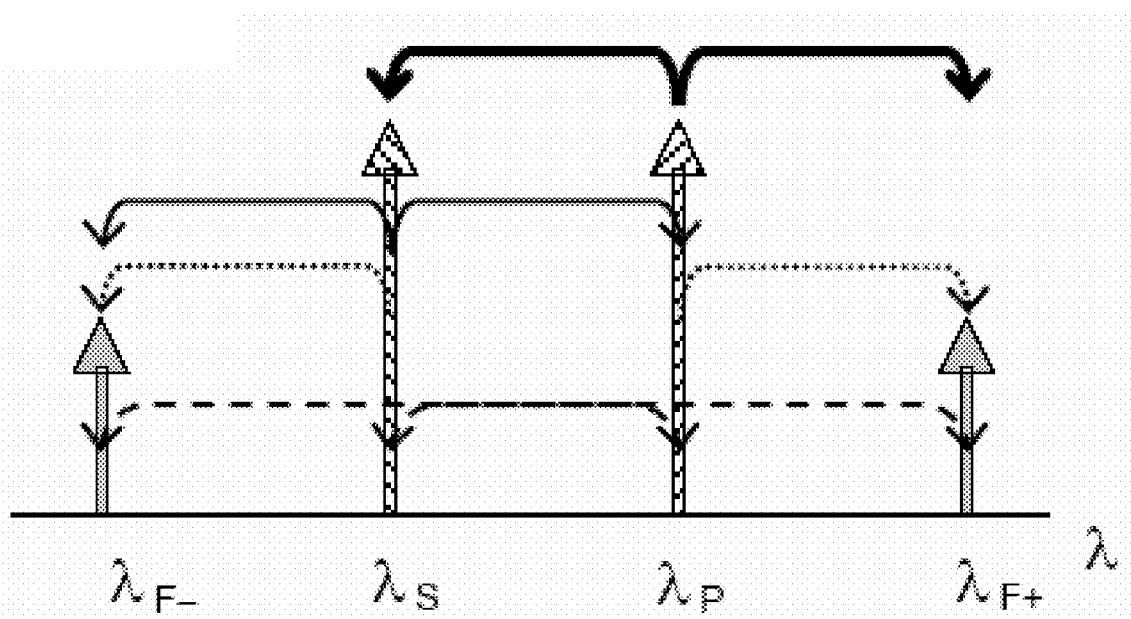
FIG. 10 is a diagram of the signal-probe FPM processes.

The counter-colliding scanning measurement is characterized by a set of uniquely defined observables that include signal, probe, pump and FPM powers, phases or polarization states measured at one or both fiber ends. Formally articulated, the simplest dispersion retrieval is the inverse problem with input variables defined by the powers of controlled signals and FPM waves, measured at both waveguide ends. The signal-probe FPM interactions include both degenerate and non-degenerate mixing processes, as illustrated in FIG. 10. The dominant FPM process is described by the degenerate photon exchange whereby two probe photons are annihilated and create anti-Stokes and Stokes-shifted photons. Prediction of the evolution of all interacting pulses is provided by the nonlinear Schrödinger equation for the envelope A(z,t) at a chosen carrier frequency using the standard split-step formalism:

$$\frac{dA}{dz} = \left(-\frac{\alpha}{2} + \hat{D} - j\gamma|A|^2\right)A, \quad (3)$$

in which $\alpha$ is a fiber attenuation, $\hat{D}$ is the dispersion operator term, and $\gamma$ is the fiber nonlinearity coefficient. The solution of Equation (3) requires special consideration, as it is used in the bidirectional counter-colliding geometry. Specifically, four interacting pulses are represented by distinct arrays. The length of the total representation array (combination of all interacting pulses) depends on HNLF segment length and required spatial resolution. In a typical example used during this work, a 10 nm separation between the probe and pulse involved calculation arrays with $2\times10^5$ entries.

A typical HNLF sample length is shorter than the characteristic dispersion distance and the pulse chirping takes place only at its leading and trailing edges. Therefore, the FPM interaction may be accurately predicted by considering mid-pulse power and integrating the set of coupled quasi-CW equations:

$$\frac{dA_i}{dz} = \quad (4)$$
$$\left(-\frac{\alpha}{2} + jk\right)A_i - j\gamma_{ii}|A_i|A_i - j2\left(\sum_{k\neq i}\gamma_{ki}|A_k|^2 A_i + \sum \frac{\gamma_{ijkl}}{1+\delta_{jl}}A_j A_k^* A_l\right),$$

where $\delta_{jl}$ is a Kronecker symbol; $A_j$, $A_k$, and $A_l$ are the amplitudes of the waves contributing to $f_i+f_j \Leftrightarrow f_i+f_k$ process. The first term in Equation (4) is a linear dispersive phase shift depending on coordinate; while the rest describe self-phase modulation (SPM), cross-phase modulation (XPM), and remaining FPM nonlinear interactions.

Figure 11A:
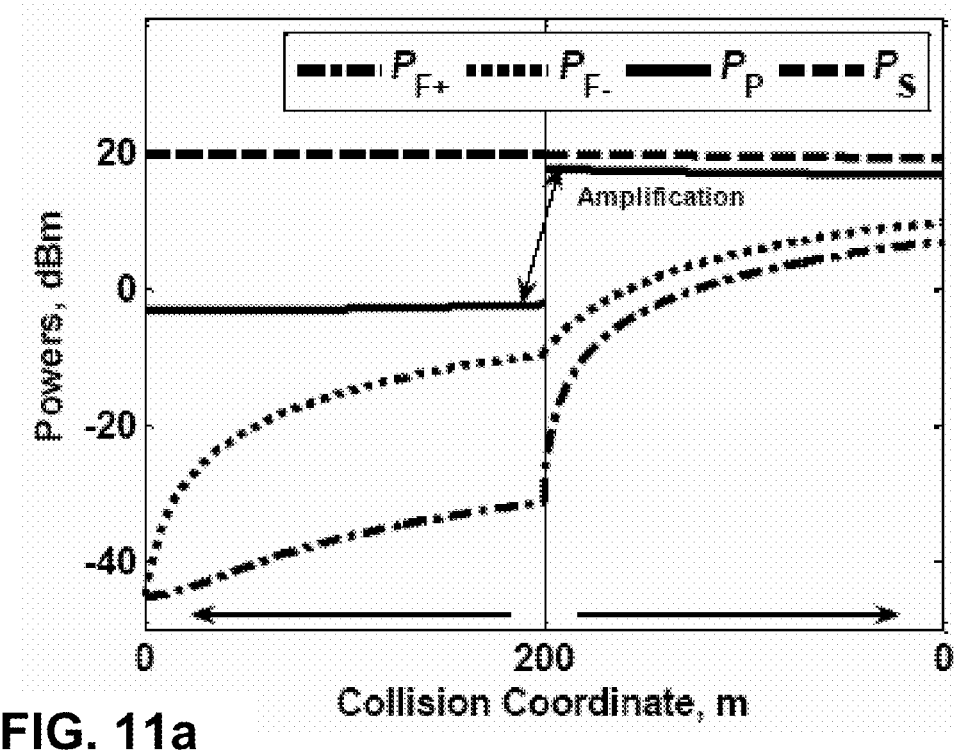
FIGS. 11a and 11b are, respectively, power and phase evolution for signal, probe and FPM waves during collision scanning of a 200 m long HNLF section.
Figure 11B:
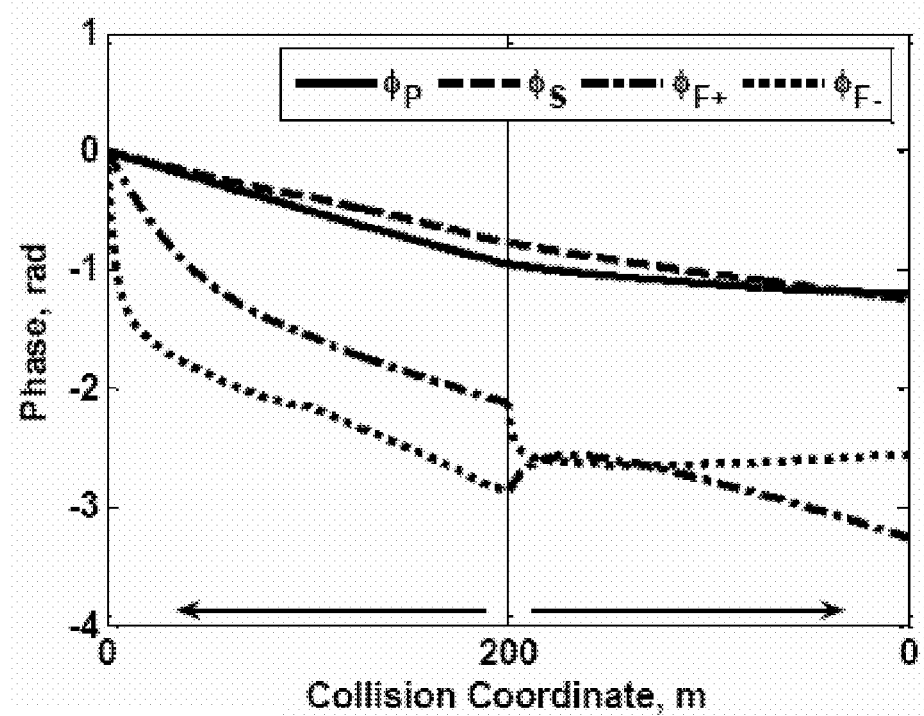

The set of Equations (4) was solved numerically to illustrate the spatial evolution of the FPM wave before and after the pump-probe collision instance. FIG. 11 illustrates the collision scanning process for a 200 m-long HNLF section by plotting the evolution of powers and phases for all four observables (signal, probe, Stokes and anti-Stokes FPM waves). All traces to the right of the 200 m mark correspond to the power/phases at the fiber end. The traces to the left correspond to the power/phases just prior to the collision point. The power evolution was defined by the incident signal and probe waves launched with $P_S=100$ mW and $P_P=0.5$ mW and centered at 1540 and 1538 nm into a 200 m-long HNLF fiber with $\lambda_0=1579$ nm, $S_\lambda=0.025$ ps/nm2/km, and $\gamma=25$ km$^{-1}$W$^{-1}$. The gain experienced by the probe wave was 20 dB at each collision instance. While the format chosen to plot FIG. 11 might seem unconventional, it was carefully selected to illustrate the FPM localization of the new measurement method. The plot is segmented into two sections that correspond to wave powers immediately prior to the collision (left of the 200 m mark) and powers measured at the end of the fiber for each collision point (right of the 200 m mark). In the absence of any collision, the powers of all four waves at the end of the fiber can be read just left of the 200 m mark ($P_S=20$ dBm, $P_P=-3$ dBm, $P_{F-}=-9$ dBm, $P_{F+}=31$ dBm). In the case of a collision instance at, e.g., $z_C=100$ m, the power of four waves at the end of the fiber is read right of the 200 m mark ($P_S=20$ dBm, $P_P=17$ dBm, $P_{F-}=1$ dBm, $P_{F+}=3$ dBm).

Figure 12:
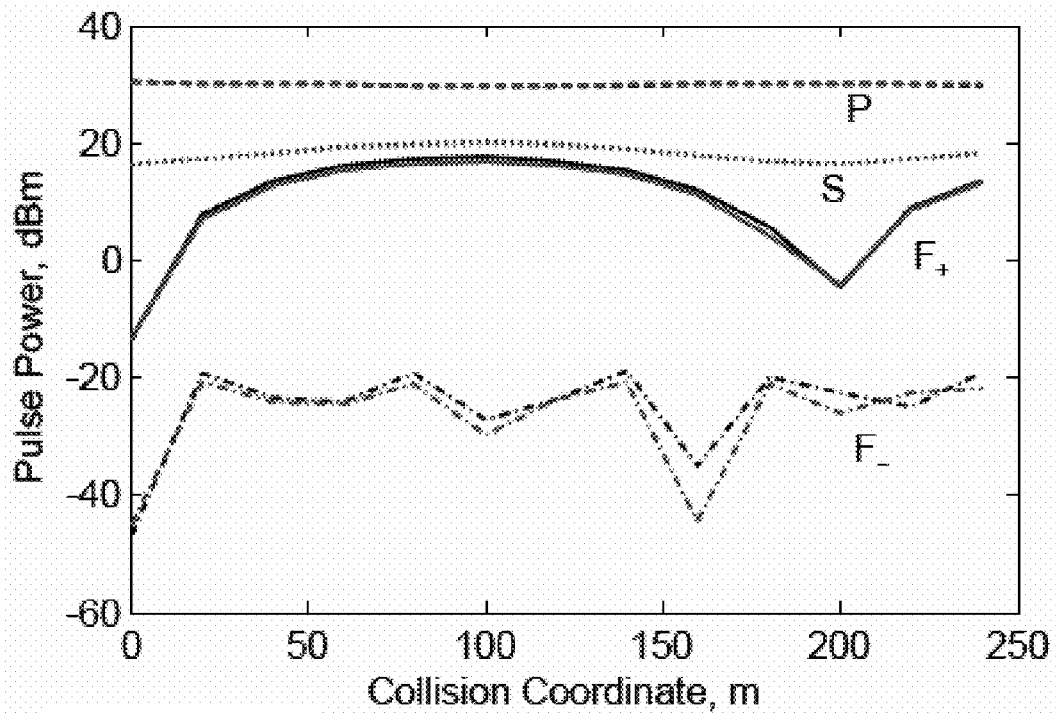
FIG. 12 is a plot of pulse power for the probe, second pulse and FPM sidebands at the end of the fiber.

FIG. 11 shows that the significant growth of the power of FPM sidebands takes place only after probe amplification. Furthermore, the abrupt phase change in the FPM tone is also induced at the collision instance and is quantified by the last term of Equation (4). Indeed, if the localized collision increment for the mixing terms $A_{F+/-}$ (given by $\gamma A_{P/S}^2 A_{S/P}\Delta z$), is considerably larger than the mixing powers just prior to the collision, their phases are governed by the complex amplitude of the amplified probe pulses. The validity of the quasi-CW approximation was verified by solving the time-dependent nonlinear Schrödinger equation describing the counter-collision process. Time-dependent simulations (Equation (3)) indicated excellent agreement with the quasi-CW approach described by Equation (4). This agreement is illustrated in FIG. 12, indicating near-vanishing differences for all interacting wave powers. The simulation that was used launched the probe ($P_P=15$ mW, $\lambda_P=1558$ nm), amplified by 20 dB at every collision instance, and the second pulse ($P_S=65$ mW, $\lambda_P=1523$ nm) propagated in 250 m of HNLF with $\lambda_0=1560$ nm, $S_\lambda=0.026$ ps/nm$^2$/km, and $\gamma=14.5$ km$^{-1}$W$^{-1}$.

The solution of Equation (4) is driven by a linear dispersion fluctuating term, which is the main interest of this effort. However, it is not clear that the solution of Equation (4) would correspond to a unique dispersion fluctuating map since the observables (the output powers) depend on the integrated rather than on the localized phase. To further complicate the issue, note that any non-negligible nonlinear phase rotation and unaccounted power transfer between the pulses would mimic unphysical dispersion fluctuations. However, many collision instances allow for additional criteria to be used in order to eliminate the measurement uncertainty, leading to a unique dispersion fluctuating solution. If the power transfer between the probe and the second pulse is negligible before the collision instance (undepleted propagation), the power evolution of the Stokes amplitude $A_{F+}$ is described by:

$$\frac{dA_{F+}}{dz} = \left(-\frac{\alpha}{2} + j\kappa\right)A_{F+} - j\gamma(|A_{F+}|^2 A_{F+} + 2(|A_P|^2 + |A_S|^2)A_{F+} + A_P^2 A_S^*), \quad (5)$$

where $A_P$ and $A_S$ are the amplitudes for the probe centered at $f_P$, the pulse $f_S$, and the Stokes wave at $2f_P - f_S$. Assuming negligible fiber loss, Equation (5) can be simplified by using the transformation:

$$A_{F+} = B_{F+} \exp[j\int \kappa_{lin} - \gamma(|B_{F+}|^2 + 2(|B_P|^2))dz], \quad (6)$$

which allows the FPM evolution to be rewritten in the rotating frame of reference:

$$\frac{dB_{F+}}{dz} = -j\gamma B_P^2 B_S^* e^{j\phi(z)}. \quad (7)$$

In Equation (7), the phase term $\phi(z)$ defines total (linear and nonlinear) retardation seen by the FPM wave. A new variable $\phi(z)$ represents the accumulated phase mismatch experienced by the FPM wave. The phase mismatch combines both linear $\kappa_{lin}(z)$ and nonlinear $\kappa_{nl}(z)$ contributions defined as:

$$\phi_{lin}(z) = \gamma \int_0^z \Delta\kappa_{lin}(z') dz', \quad (8)$$

$$\phi_{nl}(z) = \gamma \int_0^z (2P_P(z') - P_S(z') - P_{F+}(z')) dz'. \quad (9)$$

The kernel $\Delta\kappa_{lin}$ in Equation (4) is given by standard expansion:

$$\Delta\kappa_{lin} = -(2\pi)^2 \beta_2(f_{ref})(f_p - f_S)(f_{F+} - f_P) - \frac{1}{2}(2\pi)^3 \beta_3(f_{ref})(f_S - f_P)(f_{F+} - f_P)((f_S + f_{F+}) - 2f_{ref}) \quad (10)$$

As implied by Equation (9), the 1:2 ratio between the probe ($P_P$) and the signal ($P_S$) can be used to minimize the nonlinear contribution to total phase mismatch. By acquiring the power of all four waves at the end of the fiber, it is possible to solve the inverse problem and retrieve the dispersion fluctuation map of the entire fiber length. Thus, three distinct strategies are available to solve the inverse problem.

Figure 13:
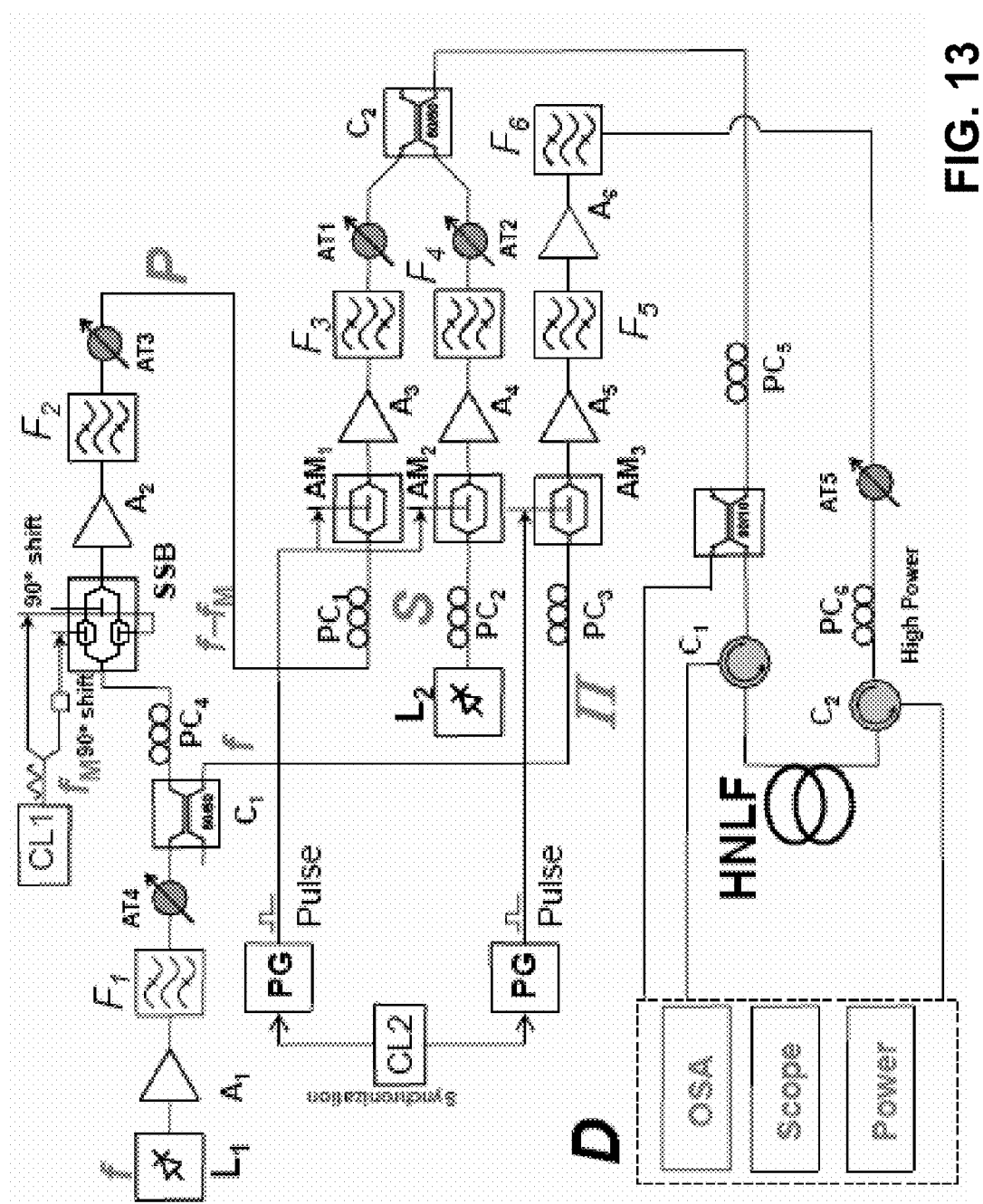
FIG. 13 is a schematic of an experimental set-up for validation of the dispersion measurement method of the present invention.

FIG. 13 illustrates one example of an experimental setup used to validate the above measurement principles. A continuous wave (CW) laser source $L_1$ was split ($C_1$) and used to create the frequency-locked pump (II) and the probe (P) waves. Firstly, the probe wave was downshifted by the Brillouin frequency corresponding to each collision instance using the single sideband (SSB) modulator driven by the adaptive clock $CL_1$. The SSB clock tracked the Brillouin frequency for each collision instance. Secondly, the probe and pump pulses were created by the amplitude modulators $AM_1$ and $AM_3$. An independent laser source $L_2$ and modulator $AM_2$ were used to generate a signal (S) co-propagating with the probe. Two laser branches were temporally balanced to obtain a complete overlapping of interacting pulses. The pump and probe pulses were generated by two independent pattern generators (PG) synchronized to a master clock ($CL_2$). The spatial localization of the pulse within HNLF was controlled by programmed bit sequences in each PG unit. The accuracy of such pulse positioning (time sampling) was defined by the inverse clock frequency. The experiment used a 1 GHz master clock, guaranteeing or substantially guaranteeing the spatial (temporal) sampling interval of 20 cm (1 ns). The complement of amplifiers ($A_{1-6}$), attenuators ($AT_{1-5}$), and polarization controllers ($PC_{1-5}$) were used to manage the polarization and power states. Thin film tunable filters ($F_{1-6}$) were used after every amplifier to suppress spontaneous noise. Circulators $C_1$ and $C_2$ were used to couple counter-propagating pulses and collect the signal, probe, pump and FPM waveforms. The polarization and (Brillouin-shift) frequency state of the interacting waves were strictly controlled prior to each collision instance, facilitated by monitoring provided by an optical spectrum analyzer, oscilloscope and power meter diagnostic block (D).

In one embodiment, the power transfer from the pump pulse to the probe pulse is strictly localized to the collision interval only, avoiding or reducing any interaction with the pump pulse pedestal (trailing edge). Practically, any modulation scheme used for pump pulse formation has a finite extinction ratio, leading to non-zero light level trailing the main pulse. If this power level is lower than the characteristic threshold of the nonlinear effect (Brillouin in this case), the power transfer between the probe pulse and the pump pedestal becomes negligible. Conversely, non-negligible probe pulse amplification will occur even in the absence of the collision with the main pump pulse. Such amplification regime is distributed, rather than spatially localized, and represents the exact opposite of the scheme desired in the type of measurement under consideration. Furthermore, it is important to note that in the latter case, the probe pulse would become significantly impaired by the amplified spontaneous noise accumulated along the entire fiber length. To illustrate its impact, it is sufficient to estimate the Brillouin threshold of a 250 m long HNLF segment using standard scaling between gain, effective area and the effective fiber length. The combination of Watt pump peak power and SBS threshold power of ~20 mW, dictates the minimum 20 dB extinction ratio to be maintained throughout the measurement at $AM_3$. However, it has been determined that the probe gain and OSNR degradation can serve as a reliable feedback signature in cases when collision did not occur within the HNLF.

Figure 14:
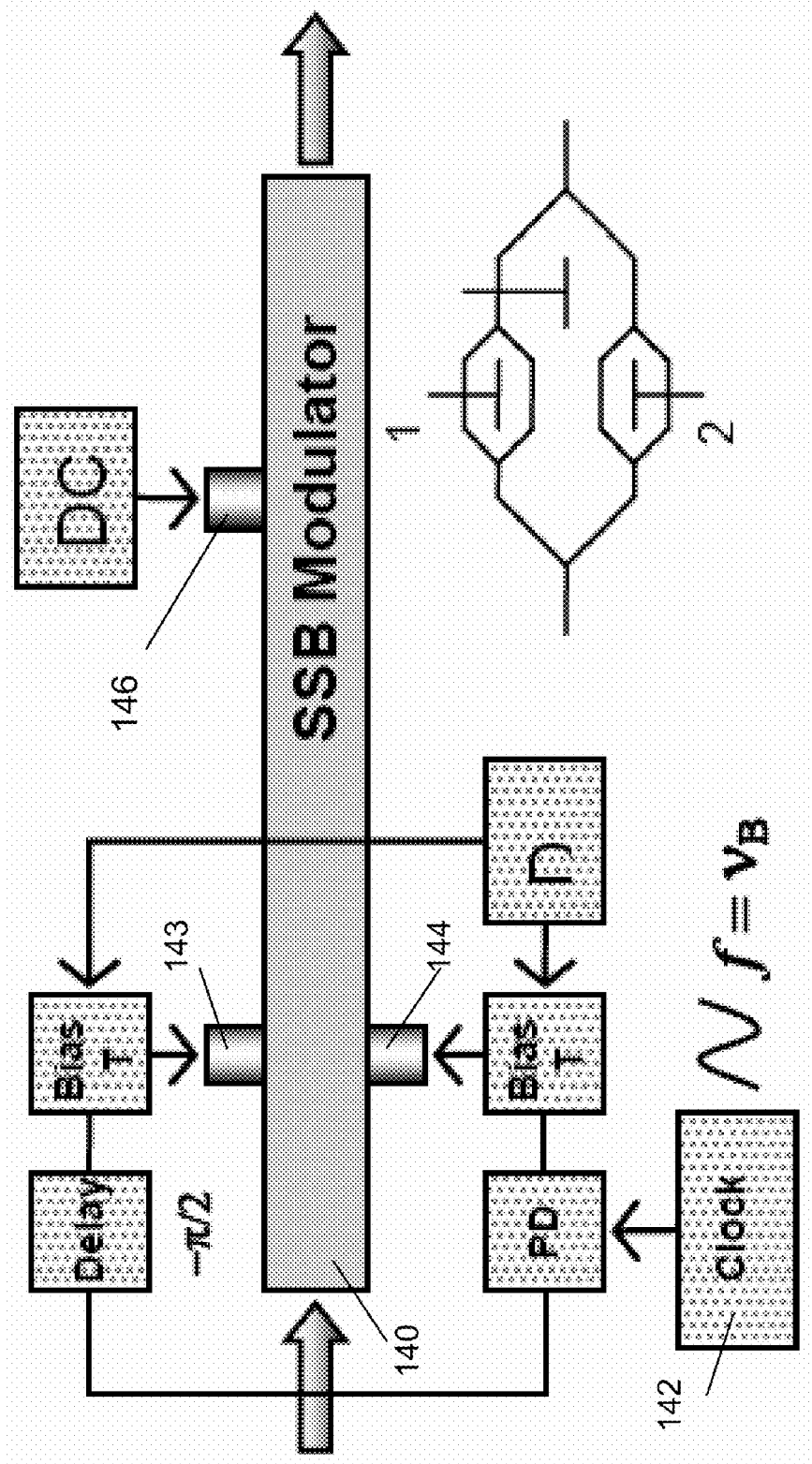
FIG. 14 is a diagram of a single sideband (SSB) modulator biasing scheme.

As previously described, the frequencies of interacting signals should preferably be precisely locked due to the narrow (~20 MHz) SBS gain profile. In one embodiment, a stable frequency position was obtained by splitting the output of the laser and shifting the frequency of the single output by the optical single sideband (SSB) modulator. The implementation of the shifting scheme is shown in FIG. 14: a single clock 142 drives two RF arms 143, 144 of the modulator 140; a single arm is delayed by a clock quarter period, while the third (DC) input of the SSB modulator sets a 90° phase shift between its lower and upper arms. (The inset indicates the interferometric topology of the device.)

Figure 15:
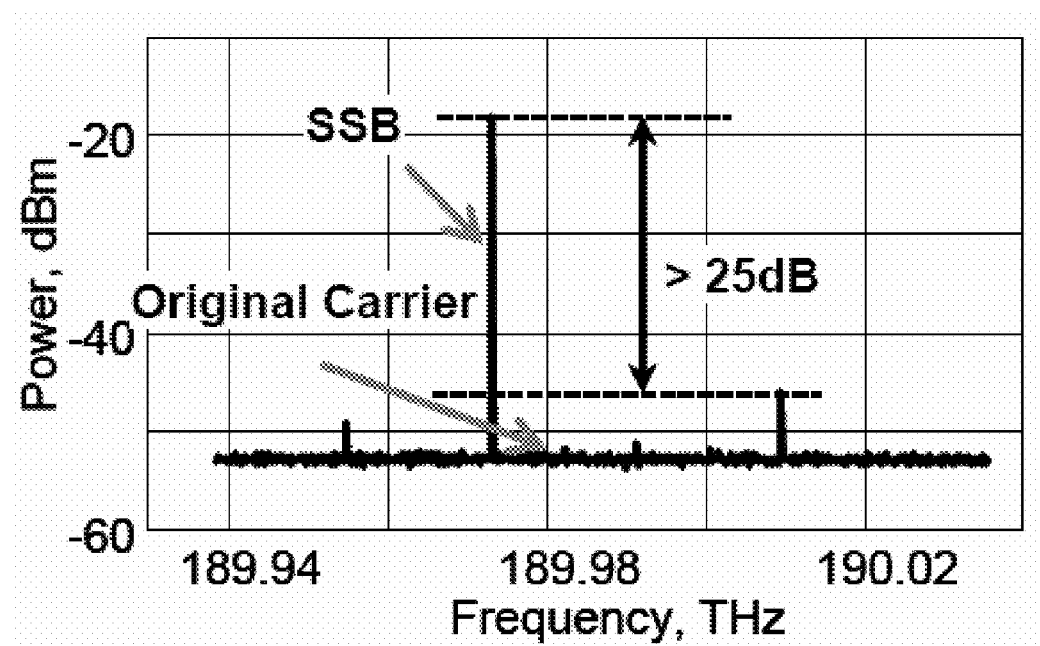
FIG. 15 is a plot of power versus frequency showing a typical spectrum achieved by SSB frequency shifting.

The biasing of the SSB modulator was a three step procedure. At the first stage, the RF modulator inputs are switched off and the reference ("zero point") voltages for interferometers 1 and 2 are set. At this configuration, the output does depend on the bias for the master (outer) interferometer because zero signals are combined. At the second stage, the RF peak amplitudes corresponding to carrier-suppressed return to zero (CSRZ) configuration are adjusted to suppress the original carrier. Finally, the phase delay at the master interferometer and the delay between RF signals are set to provide maximum power for the downshifted sideband and minimum power for any other harmonic by observing the OSA spectrum. In the ideal case, a solitary downshifted carrier is generated. In practice, the typical suppression ratio of more than 30 dB for the original carrier and 25 dB for complementary clock at triple modulation frequency can be achieved, as illustrated in FIG. 15, which shows a typical spectrum achieved by SSB frequency shifting. Precise bias tuning was performed by eliminating any modulation of the output waveform using the fast oscilloscope. The presence of the higher order harmonics typically indicated the loss of symmetry in biasing of the upper and the lower modulator arms, or the modulator being overdriven.

Referring again to FIG. 13, the motorized polarization controllers were used to set the state of the polarization (SOP) of the pump ($PC_6$) and probe/second pulse ($PC_5$). The SOP was chosen to maximize the power for the amplified probe (counter-collision gain). Specific pump/probe/signal SOP was searched using a specific strategy. In first step, initial SOP settings (±1, 0; 0), (0, ±1, 0) and (0, 0, ±1) were used in attempting to identify the octant with the maximum gain on the standard Poincare sphere. In the second step, the octant was iteratively reduced to a cone on the Poincare sphere that satisfied the condition of growing counter-collision gain. The process was repeated until the SOP was localized within the narrow cone defined by a central angle of 1° or less.

Typical HNLF measurements demonstrated that the SOP of the two interacting pulses should be updated after shifting the collision point by approximately 6 m, implying the actual polarization beating length for the HNLF.

Precise control of the pulse-probe collision position is uniquely related to the local dispersion fluctuation map. The collision scanning process originates at the end of the fiber and proceeds to cover its entire length. In one embodiment, two conditions are satisfied in order to localize the pulse collision at the end of the fiber, as follows: 1) the pulse duration multiplied by its group velocity is equal to the doubled fiber length, and 2) the pump-probe pulses overlap both at the beginning and at the end of the fiber. These conditions are illustrated in FIG. 16(*a*). The condition is produced by the precise selection of the delay between the pump and the probe pulses and loading of the length-specific bit sequence to both the pump and probe pattern generators. In practice, the pulse waveforms synthesized by the pattern generators are not ideally rectangular and possess a long trailing pulse tail with nonzero power. The pump tail could potentially interact with the probe, thus delocalizing amplification, or, equally important, the tail of probe could be amplified by the pump. This amplified tail can be clearly identified in FIG. 6. To avoid or reduce this impairment, the pattern generator temporal buffering is used, whereby additional bits were added to the original bit sequence that formed the pump/probe pulse. As an example, consider a 200 m-long fiber corresponding to 2 µs double-pass propagation time and 1 GHz master clock. In this case, the required sequence length amounts to 2000 programmed bits. Upon adding a buffer zone of 500 bits, the total bit sequence consists of 2500 bits, which is normally a sufficient guard-band to avoid the aforementioned trailing edge impairment. In the case when a bit sequence is longer than the double-pass fiber path, the fast calibration can be done by a three-step manual search illustrated in FIGS. 17*a-c*. First, as shown in FIG. 17*a*, the position of markers in the probe pattern bit sequence is used as a temporal reference (i.e. t=0). Next, as shown in FIG. 17*b*, the temporal position of the pump pulse is varied in a coarse manner to find the no-collision state, (i.e., absence of Brillouin amplification at the end of the fiber.) Finally, in FIG. 17*c*, the probe temporal reference is shifted to the position just prior to the amplification onset (t'=0, in FIG. 17*c*, i.e., a single temporal increment would toggle between a gain and zero-gain at this position). It can be noted from FIG. 17*c* that such collision points correspond exactly to the end of the fiber.

The inverse problem solution depends on accurate measurements of the pump/probe/FPM pulse powers. Measurements have demonstrated that the average powers acquired by a conventional power meter were not accurate enough to obtain the precise peak pulse powers as the typical error was approximately 2 dB.

The first reason for this inaccuracy is the finite extinction ratio of the optical modulators used to carve the pulses and create frequency-shifted carriers. Indeed, simple calculations reveal that an extinction ratio of 24 dB would lead to a 3 dB discrepancy in a 240-bit long sequence consisting of one isolated mark. As a second-order effect, the pulse generator also produces a long non-zero transient tail described above. Finally, the pulse shape after amplification does not possess an ideal rectangular shape, as shown in FIG. 6, thus prohibiting simple scaling laws.

In an alternative implementation, a pulse gating scheme, optical or electrical, can be used. Unfortunately, the optical gating scheme based on Mach-Zehnder modulators is not viable in practice due to their inherent polarization dependence: the polarization of the pulses must be adjusted for every collision instance only to impose temporal gating. In an alternative implementation, acousto-optic modulators are polarization insensitive, but have a long impulse response, rendering them equally inappropriate for the task at hand. To address all the issues outlined above, a fast sampling oscilloscope was used for pulse localization within the window equal to the length of the loaded bit sequence. The pulse waveforms were stored for further processing. The detection scheme contained two devices with low (<0.1 dB) polarization dependent loss (PDL): a) a variable optical attenuator required to keep the peak pulse powers within the linear reception band; and b) a tunable optical filter required to select a single spectral tone and suppress background noise. Prior to any waveform acquisition, the zero-mean thermal noise was reduced by multiple averaging.

Finally, in case when the probe and the signal pulse powers were high, the undepleted approximation was no longer valid and did not allow simple gain estimation using the ratio of the powers measured at the beginning and at the end of the fiber. This mandated the separation of SBS amplification from FPM power transfer. In the experiment, the problem was solved by switching the laser generating the second pulse off, on the course of the counter-collision gain measurement.

In the following examples, the dispersion profiles for two HNLF samples were scanned using the counter-colliding Brillouin scanning technique. At every collision point, the output waveforms for all propagating pulses, as well as the SBS gain, were stored. A real-time processing scheme was used to control the powers of the filtered signals by a variable optical attenuator, and in order to maintain an optimal dynamic range of the oscilloscope. After calibration, the waveform powers sampled at select waveform points were processed using the inverse dispersion retrieval algorithm. Subsequently, the global dispersion measurement (defined by the average dispersion of the entire segment and measured by the commercial instrument) was used as an initial guess for the inverse dispersion solver. In all retrieval examples, the dispersion slope was considered to be fixed.

Example 1

Figure 18A:
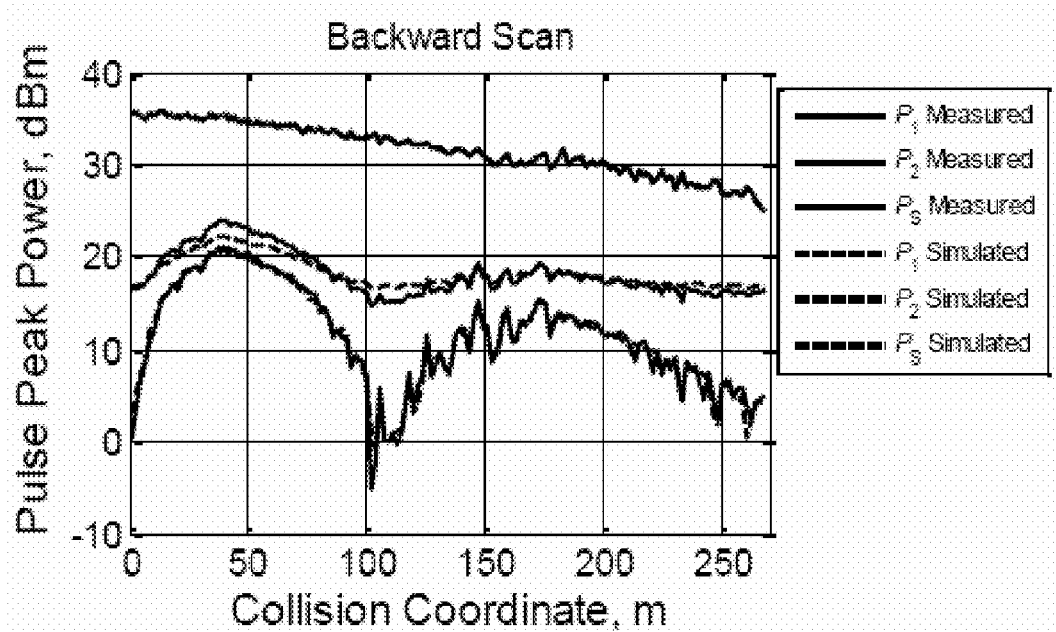
FIGS. 18a and 18b are plots of measured and calculated powers of propagated pulses in a 268 m NHLF sample for backward and forward scans, respectively.
Figure 18B:
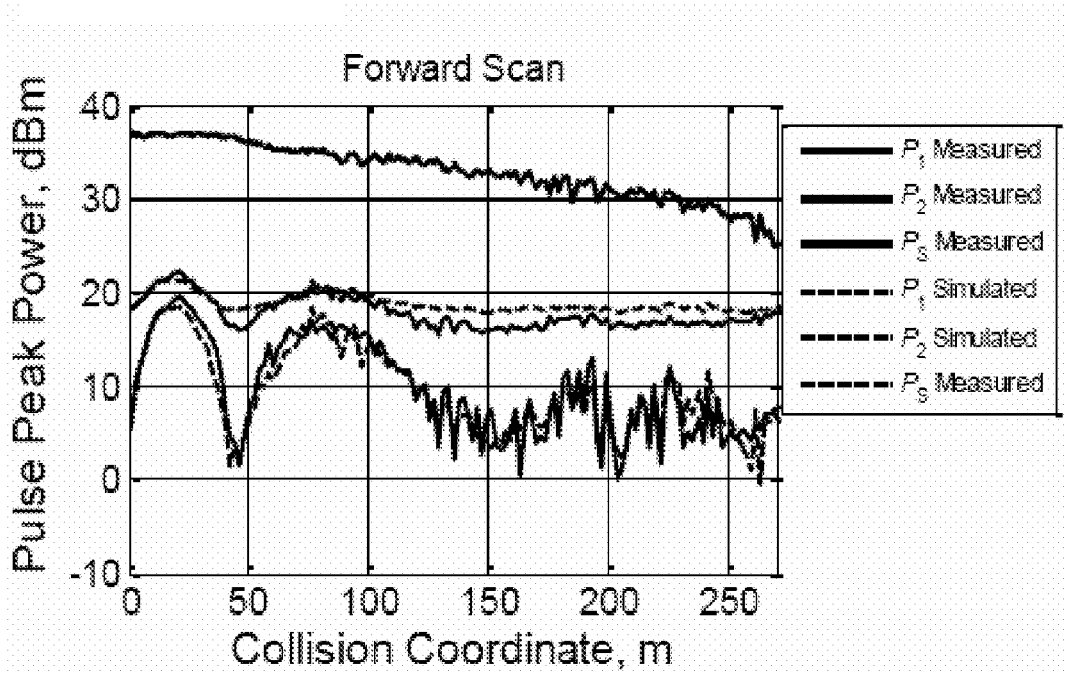
Figure 18C:
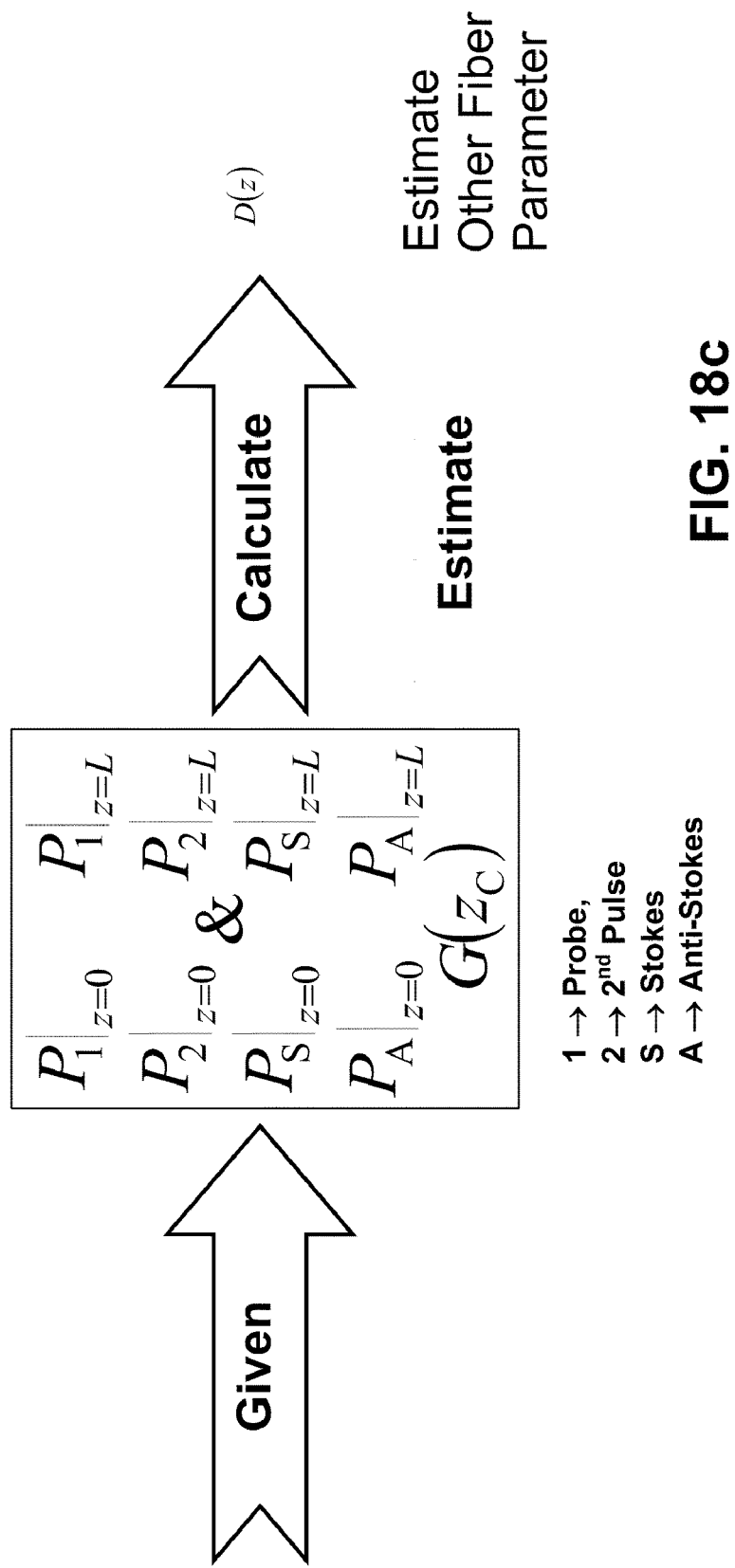
FIG. 18c is a diagram of the mathematical formulation used to generate the plotted values.

The HNLF sample with mean ZDW (zero dispersion wavelength) of 1560.5 nm and deviation $\sigma_{\lambda,0}$ less than 3 nm was scanned first in both directions by two co-propagating 10 ns pulses positioned at $\lambda_1$=1558.23 nm and $\lambda_2$=1530.23 nm and a counter-propagating 10 ns pump. FIGS. 18a and b illustrate the measured (calculated) power profiles obtained by the algorithm, both relative to the collision position ($z_C$), for the backward and forward scans, respectively. FIG. 18c provides a diagram of the general mathematical formulation used to determine dispersion. Although similar pulse powers were used in both directions, the measured power profiles are highly asymmetric with respect to the fiber directionality.

Periods of the oscillation of the Stokes sideband (100 vs. 50 m) are noticeably different, indicating that the ZDW of the last fiber section is closer to the probe wavelength $\lambda_1$. The averaged Stokes product mean-squared deviation between the measured and calculated values (upon algorithm conversion) was less than 1 dB across the entire fiber collision scan.

Figure 19:
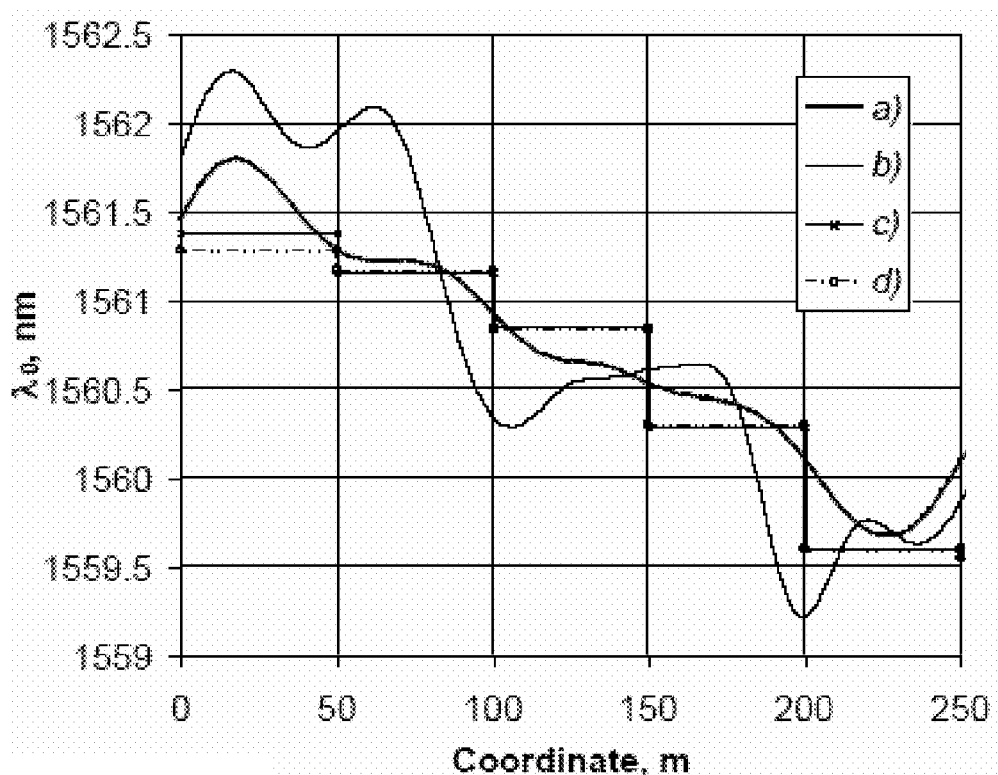
FIG. 19 is a plot of wavelength versus location in an HNLF section comparing destructive measurement and the inventive dispersion mapping method.

The fiber was cut into 50-m long segments and global ZDW of each section was measured by FWM method and noise injection method for blue and red pumps, providing only 50-m spatial resolution. In FIG. 19, curve (a) corresponds to dispersion obtained using a forward scanning counter-colliding pulse method (CCPM) for $\gamma$=14.5 km$^{-1}$W$^{-1}$; curve (b) was from backward scanning CCPM for $\gamma$=15 km$^{-1}$W$^{-1}$; curve (c) was from destructive measurement of 50-m long sections by noise injection, red pump; and curve (d) was from destructive measurement of 50-m long sections by noise injections, blue pump. FIG. 19 shows that there was good agreement between standard techniques and the inventive method using new counter-colliding techniques, and that the dispersion retrieval critically depends on accurate estimate of fiber nonlinearity parameter.

Figure 20:
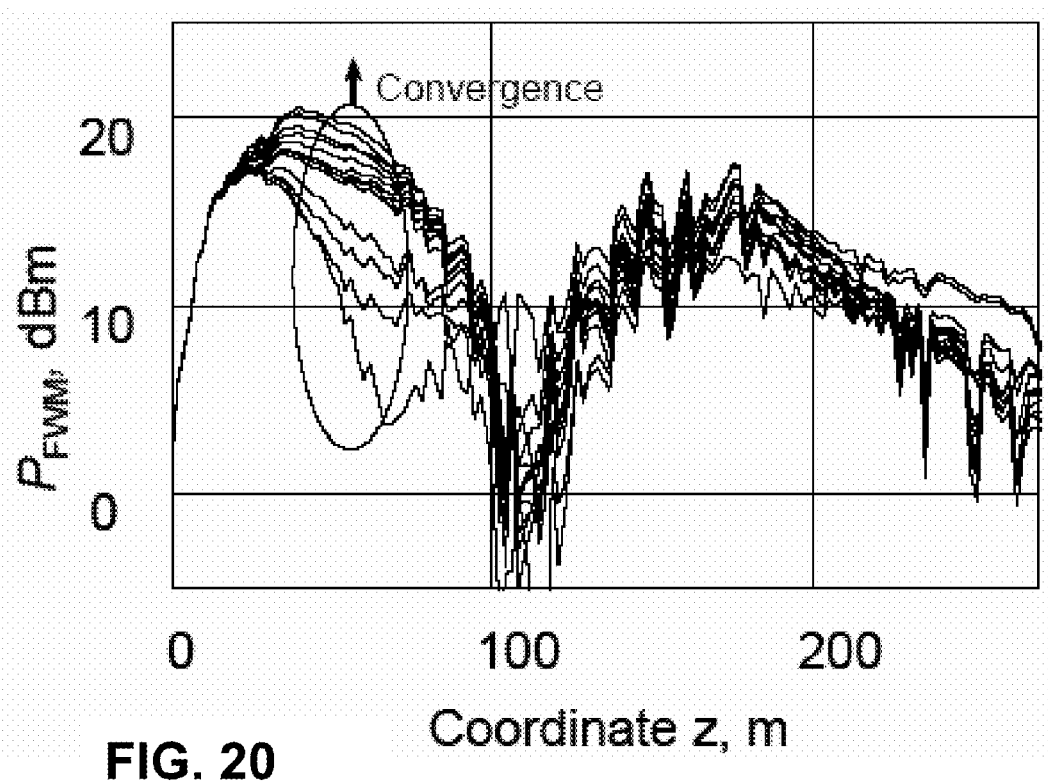
FIG. 20 is a plot of power versus location in an HNLF section showing convergence of the Stokes power.

The input powers of the co-propagated probe and second pulse were 30 mW and 58 mW, respectively, throughout the collision scan. The SBS collision gain varied from 25 dB at the end of the fiber to 15 dB at the fiber input. Gain depletion was fully accounted for in the algorithm implementation. While the pump power, as well as the gain at the last fiber section, could have been increased beyond the reported values, the pulse destruction via the generation of a spontaneous Raman seed became evident. The convergence of the inverse algorithm is illustrated in FIG. 20: the simulated Stokes power profile converged to a measured one (FIG. 18), with an initial guess defined by the constant dispersion.

Example 2

A modification of the experimental set-up was made before scanning a second fiber sample. The optical amplifier used to amplify the signal pulse was replaced by a custom-designed three-stage pre-amplifier to improve the measurement dynamic range. The modifications allowed the decrease in SBS gain to a lower value (<15 dB), while maintaining the measurement sensitivity. The power of the pump pulse remained constant during the propagation and the collision gain was more equalized along the fiber. The new configuration also allowed the powers of the probe and the signal pulse to be equalized and to eliminate the non-linear phase mismatch defined by Equation (9).

Figure 21A:
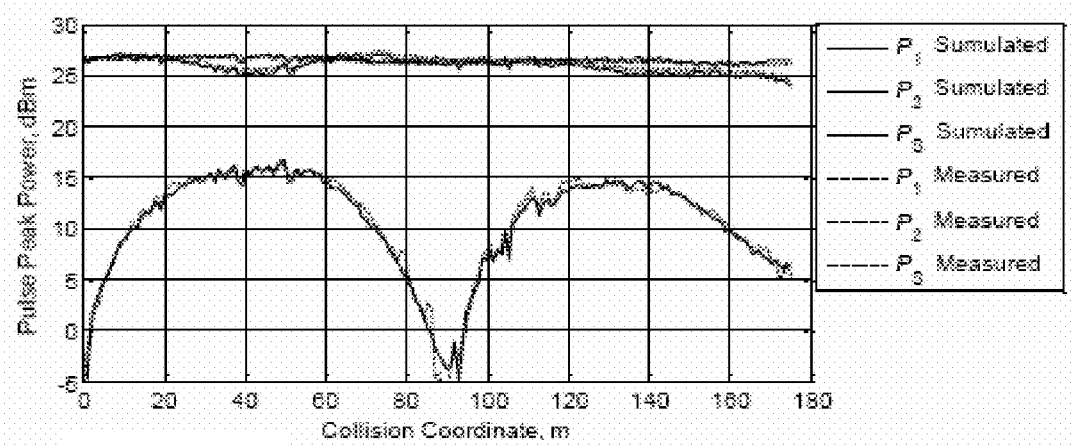
FIGS. 21a and 21b are plots of measured and calculated powers for forward and backward scanning, respectively, in a 175 m HNLF section.
Figure 21B:
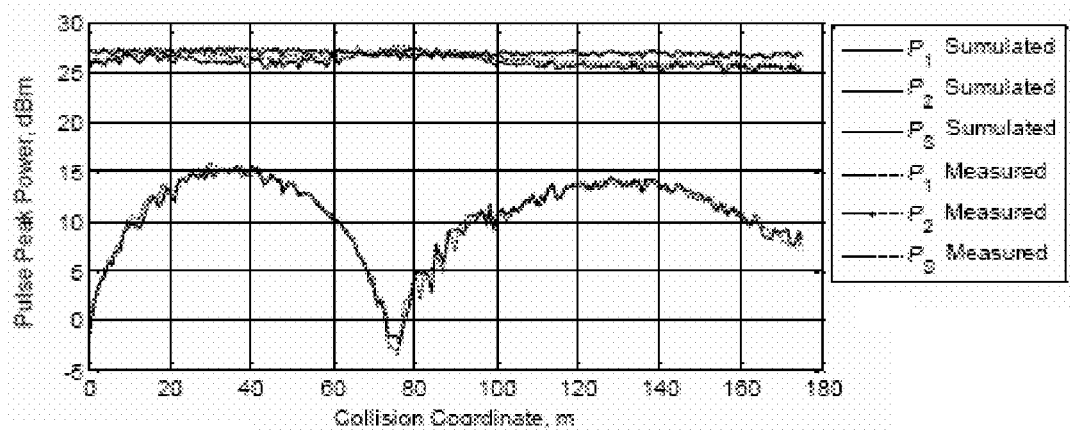

FIG. 21 illustrates the power profiles measured in both directions for a 175 m fiber sample with average SBS gain of only 12 dB ($<\lambda_0>$=1562 nm; $S_\lambda$=0.25 ps/nm$^2$/km). In this case, the period of spatial FPM oscillation differed by approximately 10 nm. The dispersion profiles were calculated using 13 harmonic-decomposition. The fiber was scanned in both directions: after completing the first collision scan, the fiber input and output were swapped and the scan was repeated, resulting in excellent agreement.

Figure 22:
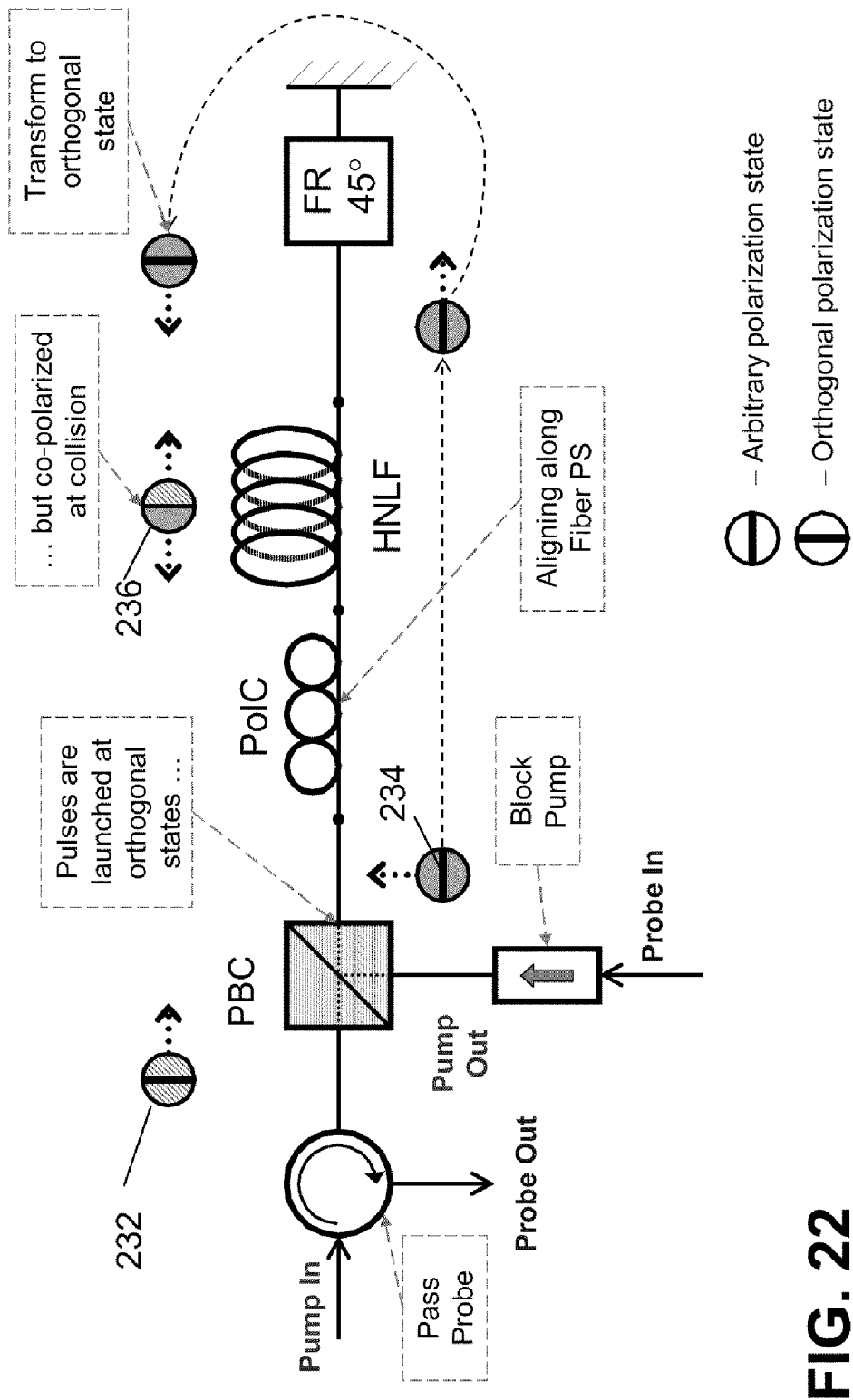
FIG. 22 is a schematic of an alternative embodiment of the measurement set-up that is polarization insensitive.

FIG. 22 illustrates an alternative embodiment of the measurement set-up that is polarization insensitive. In this embodiment, the probe 234 and pump 232 pulses are launched at orthogonal states from polarization beam combiner PBC but become co-polarized at collision 236. Faraday mirror (FR) transforms the polarization of the probe pulse (234) to a state which is orthogonal to the original launch state, so that pump pulse 232 and probe pulse 234 are copolarized to maximize or substantially maximize pump-probe energy transfer. Polarization beam combiner PBC produces a polarization orthogonal launch state between pump and probe pulses. The combined use of faraday mirror (FR) and PBC eliminates the need to search for a unique polarization launch state for maximal collision power transfer between the pump and the probe, as the described scheme produces passive self-alignment in all instances lacking substantial nonlinear polarization rotation.

Figure 23:
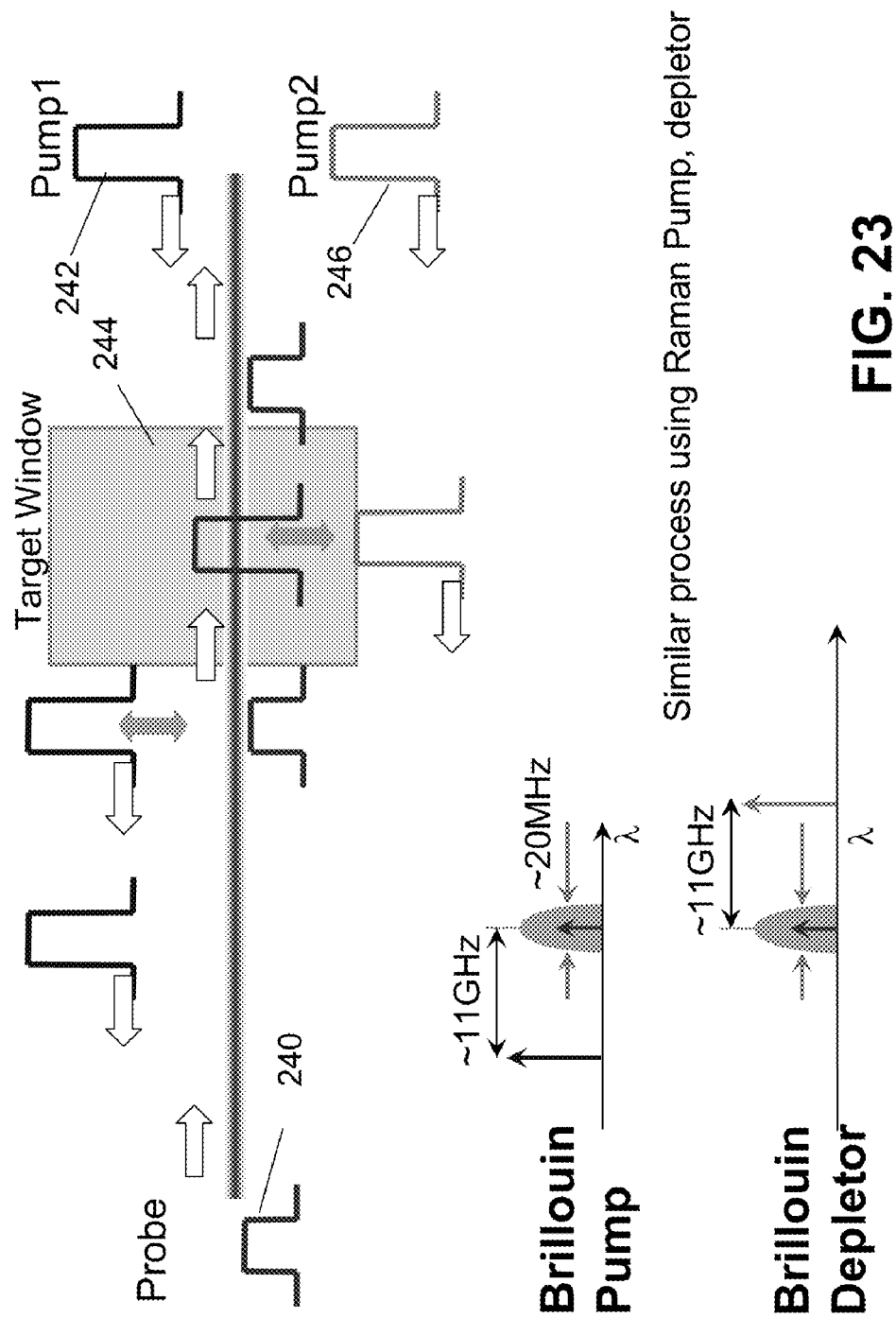
FIG. 23 is a diagram of a method for strict localization of FPM measurement using pumping and depletion counter-propagating pulses.

FIG. 23 illustrates another embodiment having an alternative energy delivery scheme that provides for FPM localization. As shown, the probe pulse 240 is amplified by counter-collision with first pump pulse 242 within the waveguide target window 244. A second pump pulse 246 is delivered to quickly de-amplify the probe, thus effectively reducing the mixing process outside the target window 244. A similar result can be achieved using a Brillouin pump for the first pump and a Brillouin depletor for the second pump. In the previous embodiments using the amplification pulse 242 only, four-photon mixing (FPM) tone is allowed to be generated from the collision instance to the fiber end. The localization is achieved by relying on a spatially shifted collision process and retrieving the difference between the two. The accuracy of the compound measurement can be compromised if either of the subsequent collision measurements is not performed properly, and, in the worst case, can lead to error propagation as the collision location is moved along the fiber or waveguide. In the embodiment of FIG. 23, the second pump pulse 246 attenuates the probe after a precisely timed interval from the amplification process by the first pump pulse 242 and lowers or attenuates the probe pulse to the level it had before the amplification occurred, so that the probe has sufficient power to produce four-photon mixing tone by interaction with the signal pulse (not drawn) only within the indicated target window. Four-photon mixing tone generated within the target window does not receive power increase or decrease outside the target window besides standard waveguide attenuation before it is received at the output of the fiber. The target window represents strict localization of the four-photon mixing process, and measurement is not affected by the degree of accuracy achieved at different target window positioned at different location within the fiber. In other words, this embodiment allows measurements to be made at any selected location in the waveguide independently from measurements at other locations, rather than requiring two measurements at spatially shifted locations followed by retrieving the difference between the measurements.

In the above embodiments, once the powers of mixing and all other tones at the output of the fiber are measured, they are digitally stored on a suitable storage medium, such as a disk, memory device, or the like. The stored data is then used to compute the dispersion map, which may be displayed on a suitable output display device, provided as a printed output, or used in other analyses as desired.

The above embodiments describe a method of measuring dispersion or other optical, mechanical or other material properties in a waveguide by increasing the pulse power of pulses in the waveguide by countercolliding energy transfer using a counterpropagating pump pulse. However, the same methods of abruptly increasing or decreasing pulse power anywhere in the waveguide may alternatively be used in alternative embodiments to modify the pulse power in a precise manner for other applications, for example in order to alter the waveform and thus the information content of the modulated signal and probe pulses.

In another alternative embodiment, rather than initially starting with weak signal and probe pulses and using a counterpropagating pump pulse of higher amplitude, the signal and probe pulses may be strong pulses, while the counterpropagating pump pulse is of lower amplitude. The lower amplitude pump pulse is controlled to collide with the signal and probe pulses at a selected location in the waveguide, cancelling mixing in the rest of the fiber. In one example, the strong signal and probe pulses may be launched in the first meter of the fiber, and collide with the counterpropagating weak pulse immediately thereafter, so that they are attenuated sufficiently to impede mixing along the remainder of the fiber. This effectively localizes FPM mixing to the first meter of the fiber, and the resultant output can be measured in a similar manner to that described above for use in measuring dispersion or other properties at a series of localized positions in a fiber or waveguide.

The present invention provides a new dispersion measurement technique that is applicable to the characterization of nearly dispersionless or arbitrary-dispersion waveguides. The inventive method can be used to measure HNLF dispersion profiles with meter-scale physical resolution for the first time. While the basic principle was demonstrated using single pump-probe counter-collision, the main principle of localized FPM by discrete power delivery can be applied to a diversified set of new measurement techniques. The meter-scale spatial resolution demonstrated by this work can be increased to micron-scale by using Raman, rather than on the Brillouin process for pump-probe localized power delivery. The high resolution dispersive method using Raman power delivery is particularly suited to photonic crystal fiber (PCF), integrated waveguides, or any other optical waveguides requiring micron-scale spatial resolution mapping.

The inventive method can be used to enable a number of applications including development of a new class of wideband optical sources (lasers), tunable lasers over wide range (>100 nm), supercontinuum sources for sensing and biomedical applications, high precision, single- or multiple-line spectroscopic sources, arbitrary waveform generators, and optical amplifiers in arbitrary spectral band. It can also be used for wide-band spectral mapping and manipulation, wavelength conversion for communication channels, spectroscopic band mappers, high-precision dispersion mapping of installed fiber plants and a new class of dispersion measuring and monitoring instrumentation.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The following references, which provide technical background information, are incorporated herein by reference:

[1] S. Radic, C. J. McKinstrie, R. M. Jopson, J. C. Centanni, Q. Lin and G. P. Agrawal, "Record performance of a parametric amplifier constructed with highly-nonlinear fiber," *Electron. Lett.* 39, 838-839 (2003).

[2] J. Hansryd, P. A. Andrekson, M. Westlund, J. Li, and P. O. Hedekvist, "Fiber-based optical parametric amplifiers and their applications," *IEEE J. Sel. Top. Quantum Electron.*, vol. 8, no. 3, pp. 506-520 (2002).

[3] S. Radic S, C. J. McKinstrie, "Optical amplification and signal processing in highly nonlinear optical fiber", *IEICE Trans. Electronics*, vol. 5. pp. 859-869, May (2005).

[4] M. Karlsson, "Four wave mixing in fibers with randomly varying zero-dispersion wavelength", *J. Opt. Soc. Amer. B*, vol. 15, pp. 2269-2275, (1998).

[5] M. Farahmand and M. de Sterke, "Parametric amplification in presence of dispersion fluctuations," *Opt. Express* 12, 136-142 (2004).

[6] F. Yaman, Q. Lin, and R. Radic and G. P. Agrawal "Impact of Dispersion Fluctuation on Dual-Pump Fiber-Optic Parametric Amplifiers", *IEEE Photon. Techno. Lett.* Vol. 16, No. 5, pp. 1292-1294. May (2004).

[7] T. Okuno, T. Nakanishi, M. Hirano, and M. Onishi, "Practical Considerations for the Application of Highly Nonlinear Fibers", *Optical Fiber Conference*, Paper OTuJ1, (2006).

[8] J. Gripp, L. F. Mollenauer, "Enhanced range for OTDR-like dispersion map measurements.", *Optics Letters*, Vol. 23, No. 20, October (1998).

[9] I. Brener, P. P. Mitra, D. J. Thomson, "High-resolution zero-dispersion wavelength fluctuation mapping in dispersion-shifted fiber", *OFC* 1998, ThR5 (1998).

[10] M. Eiselt, R. M. Jopson, R. H. Stolen, "Nondestructive Position-Resolved Measurement of the Zero-Dispersion Wavelengthin an Optical Fiber", *Journal of Lightwave Technology*, Vol. 15, No. 1 (1997).

[11] M. Gonzalez-Herraez, P. Corredera, M. L. Hernanz, and J. A. Méndez, "Retrieval of the zero-dispersion wavelength map of an optical fiber from measurement of its continuous-wave four-wave mixing efficiency," *Opt. Lett.* 27, 1546-1548 (2002)

[12] K. Inoue, "Four-wave mixing in an optical fiber in the zero-dispersion wavelength region", Journal of Lightwave Technology, Vol. 10, No. 11, (1992).

[13] G. P. Agrawal, *Nonlinear Fiber Optics,* 3rd ed. Academic Press, San Diego, (2001).

[14] R. G. Smith "Optical Power Handling Capacity of Low Loss Optical Fibers as Determined by Stimulated Raman and Brillouin Scattering" *Applied Optics* Vol. 11, No. 11 (1972).

[15] M. Nikles, L. Thevenaz, P. A. Robert "Brillouin gain spectrum characterization in single-mode optical fibers", *IEEE Journal of Lightwave Technology*, Vol. 15, No 10, October (1997).

[16] J. M. Chavez Boggio and H. L. Fragnito "Simple four-wave-mixing-based method for measuring the ratio between the third- and fourth-order dispersion in optical fibers", *J. Opt. Soc. Am. B*, Vol. 24, No. 9, September (2007).

[17] A. W. Snyder, J. Love, *Optical Waveguide Theory*, Springer (1983).

[18] W. H. Press, *Numerical Recipes in C++*, CUP (2002).

[19] J. Nocedal, S. Wright *Numerical Optimization*, Springer (2006).

The invention claimed is:

1. A method for measurement of dispersion or other optical, mechanical or material properties of a waveguide, comprising:
   localizing four-photon mixing at a plurality of different locations within the waveguide by timing a pump pulse to counter-collide with and abruptly modify the amplitude of one or both of a probe pulse and a signal pulse at each location;
   measuring the power of each of four waves comprising a mixed signal at an output of the waveguide for each of the different locations; and
   combining the measurements to generate a spatial map of dispersion or other properties within the waveguide.

2. The method of claim 1, wherein the modification comprises amplification of one or both of the probe pulse and signal pulse.

3. The method of claim 2, wherein an amplitude of the pump pulse is greater than an amplitude of the probe pulse and the signal pulse.

4. The method of claim 2, wherein an amplitude of the probe pulse and an amplitude of the signal pulse are sufficiently low so that mixing terms with adequate powers are not generated without the pump pulse.

5. The method of claim 1, wherein the modification comprises attenuation of one or both of the probe pulse and signal pulse.

6. The method of claim 5, wherein the pump pulse has an amplitude which is lower than the amplitude of the probe pulse and signal pulse.

7. The method of claim 6, wherein the amplitude of the probe pulse and the signal pulse after attenuation are sufficiently low so that mixing terms with adequate powers are not generated after the counter-colliding attenuation.

8. The method of claim 1, wherein the waveguide has a length on the order of kilometers and the modification of the amplitude of one of the signal pulse and the probe pulse is produced by stimulated Brillouin scattering.

9. The method of claim 1, wherein the waveguide has a length on the order of meters and the modification of the amplitude of one of the signal pulse and the probe pulse is produced by stimulated Raman scattering.

10. The method of claim 1, wherein the waveguide is a highly nonlinear fiber.

11. The method of claim 1, wherein the waveguide is a general, solid core optical fiber facilitating a four-photon mixing process.

12. The method claim 2, wherein polarizations of each of the probe pulse, signal pulse and the pump pulse are aligned in order to produce a deterministic four-photon mixing term.

13. The method of claim 12, wherein the polarizations are aligned to maximize a gain produced by the countercolliding amplification.

14. The method of claim 5, wherein polarizations of each of the probe pulse, signal pulse and the pump pulse are aligned in order to produce deterministic four-photon mixing term.

15. The method of claim 14, wherein the polarizations are aligned to maximize a loss produced by the countercolliding attenuation.

16. The method of claim 1, wherein the pump pulse and the probe pulse are launched at orthogonal states and either the pump pulse or the probe pulse is reflected from a Faraday mirror, whereby active polarization tracking for each pump-probe or pump-signal collision instance is avoided or minimized.

17. The method of claim 1, wherein the pump pulse has a predetermined polarization state for facilitating optical power transfer from the pump pulse to one or both of the probe pulse and signal pulse.

18. The method of claim 1, further comprising actively controlling the polarization state at the collision of one or both of the probe pulse and signal pulse with the counterpropagating pump pulse.

19. The method of claim 1, further comprising passively controlling the polarization state at the collision of one or both of the probe pulse and signal pulse with the counterpropagating pump pulse.

20. The method of claim 19, further comprising controlling the polarization states between the pump pulse and signal pulse to be orthogonal polarization states while controlling the polarization state between the signal pulse and probe pulse to be copolarized polarization states.

21. The method of claim 20, further comprising launching the pump pulse and probe pulse into the waveguide using a polarization beam combiner to control the polarization states to be orthogonal.

22. The method of claim 21, further comprising altering the probe and the signal pulse polarization state by reflection from the Faraday mirror to facilitate collision with the pump pulse.

23. The method of claim 1, further comprising controlling the bias of a modulator used to launch frequency locked pump and signal pulses into the waveguide prior to four-photon mixing, whereby pump-signal power transfer outside a defined collision window is minimized.

24. A method for measurement of dispersion or other optical properties in an optical waveguide, comprising:
   inserting a probe pulse with a measured amplitude into the waveguide in a first direction traveling from a first end toward a second end of the waveguide;
   inserting a signal pulse with a measured amplitude into the waveguide in the first direction, wherein the probe amplitude and the signal amplitude are sufficiently low that probe and signal mixing results in negligible optical power;
   inserting a counter-propagating signal having a second amplitude larger than at least one of the probe amplitude and the signal amplitude into the second end of the waveguide, wherein the counter-propagating signal is timed to collide with and abruptly amplify one or both of the probe and the signal at a first collision coordinate within the waveguide so that a mixed signal is produced;
   measuring the power of the mixed signal at the second end;

repeating the steps of inserting a probe, inserting a signal, inserting a counter-propagating signal and measuring at a plurality of different collision coordinates along the waveguide until a desired length of the waveguide has been tested; and combining the measured powers for all collision coordinates to generate a spatial map of the optical properties of the waveguide.

25. The method of claim 24, wherein the waveguide has a length on the order of kilometers and the amplification of one of the signal pulse and the probe pulse is produced by stimulated Brillouin scattering.

26. The method of claim 24, wherein the waveguide has a length on the order of meters and the amplification of one of the signal pulse and the probe pulse is produced by stimulated Raman scattering.

27. The method of claim 24, wherein the waveguide is a highly nonlinear fiber.

28. The method claim 24, wherein polarizations of each of the probe pulse, the signal pulse and the pump signal are aligned.

29. The method of claim 28, wherein the polarizations are aligned to maximize a gain produced by the amplification.

30. The method of claim 24, wherein the pump signal and the probe pulse are launched at orthogonal states for polarization insensitivity.

31. A method for localization of four-photon mixing within an optical waveguide, comprising:

launching a probe pulse and a signal pulse into an input end of an optical waveguide, the probe pulse and signal pulse comprising weak pulses having amplitudes insufficient to produce significant four-photon mixing;

abruptly amplifying at least one of the probe pulse and signal pulse by a first counterpropagating pump pulse at a selected waveguide target window in the waveguide, the amplification being sufficient for significant four-photon generation by signal-probe pulse mixing;

measuring a power and phase of the mixed signal generated by the pulse mixing;

storing the measured power and phase of the mixed signal on a storage medium; and computing a property of the waveguide using the stored data.

32. The method of claim 31, further comprising attenuating the or each amplified pulse outside the target window by a second counterpropagating pump pulse to a level sufficient to prevent significant four-photon generation by signal-probe pulse mixing outside the target window, whereby the computed waveguide property is localized at the target window.

33. The method of claim 31, further comprising launching the first counterpropagating pump pulse at a predetermined time interval after launching of said at least one of the probe pulse and signal pulse, whereby the pulse amplification is spatially defined.

34. The method of claim 32, further comprising launching the second counterpropagating pump pulse at a predetermined time interval from the amplification, whereby the pulse attenuation is spatially defined.

35. The method of claim 31, wherein said signal pulse is amplified by the first counterpropagating pump pulse.

36. The method of claim 31, wherein said probe pulse is amplified by the first counterpropagating pump pulse.

37. The method of claim 31, wherein both said signal pulse and said probe pulse are amplified by the first counterpropagating pump pulse.

38. The method of claim 32, wherein said signal pulse is attenuated by the second counterpropagating pump pulse.

39. The method of claim 32, wherein said probe pulse is attenuated by the second counterpropagating pump pulse.

40. The method of claim 32, wherein both said signal pulse and said probe pulse are attenuated by the second counterpropagating pump pulse.

41. The method of claim 31, wherein the amplification step comprises spatially localized amplification of said at least one pulse by collision with the first counterpropagating pump pulse positioned at the Brillouin frequency required to facilitate optical power transfer from the counterpropagating pump pulse to said at least one pulse.

42. The method of claim 32, wherein the attenuation step comprises spatially localized attenuation of said at least one pulse by collision with the second counterpropagating pump pulse positioned at the Brillouin frequency required to facilitate optical power transfer from said at least one pulse to the second counterpropagating pump pulse.

43. The method of claim 42, wherein the optical power of the counterpropagating pump pulse is lower than that of said at least one pulse prior to the collision instance.

44. The method of claim 31, wherein the first counterpropagating pump pulse has a predetermined polarization state for facilitating optical power transfer from the first counterpropagating pump pulse to said at least one pulse during amplification.

45. The method of claim 32, wherein the second counterpropagating pump pulse has a predetermined polarization state for facilitating optical power transfer from the second counterpropagating pump pulse to said at least one pulse during attenuation.

46. A method of abrupt power adjustment in an optical waveguide, comprising:

launching a probe pulse and a signal pulse into a first end of an optical waveguide;

inserting a counterpropagating pump pulse into a second end of the waveguide, the counterpropagating pump pulse having a different amplitude from the probe pulse and signal pulse, wherein the counterpropagating pump pulse is timed to collide with and abruptly modify the amplitude of one or both of the signal and probe pulses by power transfer at selected location in the waveguide; and obtaining information from the modified signal output at the second end of the optical waveguide.

47. The method of claim 46, wherein the modification comprises amplification of at least one of the probe pulse and signal pulse, the amplification being sufficient for significant four-photon generation by signal-probe pulse mixing.

48. The method of claim 46, wherein the modification comprises attenuation of at least one of the probe pulse and signal pulse.

49. The method of claim 46, wherein the modification comprises amplification of both the probe pulse and the signal pulse.

50. The method of claim 46, wherein the amplitude modification of the at least one pulse is spatially defined by timing between the forward propagating signal or probe pulse and the counterpropagating pump pulse.

51. The method of claim 46, wherein the amplitude modification is spatially defined by positioning the counterpropagating pump pulse for collision with the probe or signal pulse at the Brillouin frequency required to facilitate optical power transfer between the colliding pulses.

52. The method of claim 46, wherein the polarization states of the probe or signal pulse and the counterpropagating pump pulse are actively controlled.

53. The method of claim 46, wherein the polarization states of the probe or signal pulse and the counterpropagating pump pulse are passively controlled.

54. The method of claim 53, wherein the polarization states are controlled to be orthogonal polarization states by a polarization beam combiner.

55. The method of claim 53, wherein the probe pulse and signal pulse polarization states are controlled by reflection from a Faraday mirror.

56. The method of claim 47, further comprising measuring the power and phase of the mixed signal generated by the pulse mixing, using the measured power and phase to compute an output which corresponds to a property of the waveguide, and providing the output on a medium accessible by a user.

57. The method of claim 46, further comprising controlling the power transfer to alter the pulse waveform of at least one of the signal and probe pulses in a predetermined manner, whereby information content carried by the at least one pulse is modified.

* * * * *